(12) United States Patent
Zhu

(10) Patent No.: US 10,813,026 B2
(45) Date of Patent: Oct. 20, 2020

(54) COMMUNICATION DEVICE AND METHOD FOR INTER-SYSTEM HANDOVER FOR A USER EQUIPMENT (UE)

(71) Applicant: HUAWEI TECHNOLOGIES CO., LTD., Shenzhen, Guangdong (CN)

(72) Inventor: Qianghua Zhu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/395,588

(22) Filed: Apr. 26, 2019

(65) Prior Publication Data
US 2019/0253943 A1 Aug. 15, 2019

Related U.S. Application Data

(63) Continuation of application No. PCT/CN2016/103551, filed on Oct. 27, 2016.

(51) Int. Cl.
*H04W 36/12* (2009.01)
*H04W 36/00* (2009.01)
(Continued)

(52) U.S. Cl.
CPC .......... *H04W 36/12* (2013.01); *H04W 8/245* (2013.01); *H04W 36/0083* (2013.01);
(Continued)

(58) Field of Classification Search
CPC . H04W 36/0083; H04W 36/14; H04W 76/11; H04W 80/10; H04W 8/245; H04W 8/26; H04W 92/02
See application file for complete search history.

(56) References Cited

U.S. PATENT DOCUMENTS

2004/0266436 A1* 12/2004 Jaakkola ........... H04L 29/12783
455/436
2005/0130659 A1* 6/2005 Grech .................... H04L 63/08
455/436
(Continued)

FOREIGN PATENT DOCUMENTS

CN 101562867 A 10/2009
CN 101720115 A 6/2010
(Continued)

OTHER PUBLICATIONS

Huawei Technologies France,"Support of application and UE mobility",MCT(15)000252r1,Jan. 7, 2016,total 2 pages.
(Continued)

*Primary Examiner* — Mewale A Ambaye
(74) *Attorney, Agent, or Firm* — Westerman, Hattori, Daniels & Adrian, LLP

(57) ABSTRACT

Embodiments of the present application provide a communication method and a device, which are used for inter-system handover of UE, so that a connection can be established between a source application management unit and a target application management unit, thereby effectively improving communication efficiency. The method in the embodiments of the present application includes: obtaining, by a network device, a source system identifier of a source application system and/or a target system identifier of a target application system; and sending, by the network device, the source system identifier to a target application management unit, or sending the target system identifier to a source application management unit, so that a connection is established between the source application management unit and the target application management unit, and the source application management unit and the target application management unit communicate with each other.

15 Claims, 13 Drawing Sheets

(51) Int. Cl.
H04W 36/14 (2009.01)
H04W 76/11 (2018.01)
H04W 8/24 (2009.01)
H04W 80/10 (2009.01)
H04W 8/26 (2009.01)
H04W 92/02 (2009.01)

(52) U.S. Cl.
CPC ............ H04W 36/14 (2013.01); H04W 76/11 (2018.02); H04W 80/10 (2013.01); H04W 8/26 (2013.01); H04W 92/02 (2013.01); Y02D 70/00 (2018.01)

(56) References Cited

U.S. PATENT DOCUMENTS

| | | | | |
|---|---|---|---|---|
| 2007/0036109 | A1* | 2/2007 | Kwak | H04W 36/0066 370/331 |
| 2009/0149183 | A1* | 6/2009 | Wu | H04L 12/4633 455/436 |
| 2009/0239527 | A1* | 9/2009 | Forsten | H04W 4/10 455/426.1 |
| 2015/0078173 | A1* | 3/2015 | Javed | H04W 36/00 370/241 |
| 2018/0192337 | A1* | 7/2018 | Ryu | H04W 36/0066 |

FOREIGN PATENT DOCUMENTS

| | | |
|---|---|---|
| CN | 102695290 A | 9/2012 |
| CN | 102761917 A | 10/2012 |
| EP | 1705869 A1 | 9/2006 |
| WO | 2015200801 A1 | 12/2015 |
| WO | 2016128055 A1 | 8/2016 |
| WO | 2017129742 A1 | 8/2017 |

OTHER PUBLICATIONS

ETSI GS MEC 003 V1.1.1 (Mar. 2016),Mobile Edge Computing (MEC);Framework and Reference Architecture,total 18 pages.
3GPP TSG-RAN WG2 Meeting #93BIS,R2-162310,:"Introduction of NB-IoT",Huawei,Dubrovnik, Croatia, Apr. 11-15, 2016,total 290 pages.
Sherif Akoush et al.,"Predicting the Performance of Virtual Machine Migration",2010 18th Annual IEEE/ACM International Symposium on Modeling, Analysis and Simulation of Computer and Telecommunication Systems,total 10 pages.
S2-162144;(revision of S2-161998); China Mobile, ATandT, Telecom Italia, CATR, Nokia, Sprint, Huawei, Intel, ZTE; Key issue-support of mobile edge computing; SA WG2 Meeting #114; Apr. 11-15, 2016, Sophia Antipolis, France; Agenda Item: 6.10.0; Work Item / Release:NextGen/R-14; total 7 pages.
3GPP TR 23.799 V1.0.2 (Sep. 2016); 3rd Generation Partnership Project; Technical Specification Group Services and System Aspects; Study on Architecture for Next Generation System (Release 14); total 423 pages.
ETSI GS MEC-IEG 005 V1.1.1 (Aug. 2015),Mobile-Edge Computing (MEC);Proof of Concept Framework. (14 pages).
Office Action dated Apr. 24, 2020, issued in counterpart CN application No. 201680090108.1, with English translation. (5 pages).

* cited by examiner

COMMUNICATION DEVICE AND METHOD FOR INTER-SYSTEM HANDOVER FOR A USER EQUIPMENT (UE)

CROSS-REFERENCE TO RELATED APPLICATIONS

This application is a continuation of International Application No. PCT/CN2016/103551, filed on Oct. 27, 2016, which is hereby incorporated by reference in their entireties.

TECHNICAL FIELD

The present application relates to the communications field, and specifically, to a communication method and a device.

BACKGROUND

In a next-generation mobile network, a plurality of application systems separately provide a service for user equipment (UE), and each application system includes a corresponding application network and a corresponding application management unit.

When a location of the UE changes, as shown in FIG. 1b, when the UE moves from a service area of an application network 1 of an application system (referred to as a source application system below) to a service area of an application network 2 of another application system (referred to as a target application system below), to enable a user to get good service experience anywhere at any time, the UE performs inter-system handover, to be specific, is handed over from the source application system to the target application system. In a handover process of the UE, a target application management unit obtains location information and application information of the UE, and determines target location information of an application in the target application system; a source application management unit obtains the target location information allocated by the target application management unit to the application, and triggers application migration; and finally, after preparation of the application in the target application system is completed, a local offloading rule of a target user plane is activated.

In the prior art, because the source application management unit and the target application management unit belong to different application systems, the source application management unit and the target application management unit cannot directly communicate with each other. Instead, a third party, such as a client that is communicating with a to-be-migrated application, obtains application information of the UE from the source application management unit by using an API, and then sends the application information of the UE to the target application management unit; the target application management unit determines a running location of the application in the target application system based on the application information of the UE and a location of the UE, and then sends application target location information to the third party; and the third party sends the application target location information to the source application management unit, to complete handover of the UE.

It can be learned that, in the prior art, a message can be forwarded between the source application management unit and the target application management unit only by using the third party. First, a mobile communications system does not support such a communication manner; and second, communication efficiency is relatively low in this manner. Therefore, a new manner is required, so that application management units in two application systems can address each other and directly communicate with each other.

SUMMARY

Embodiments of the present application provide a communication method and a device, which are used for inter-system handover of UE, so that a connection can be established between application management units in different application systems, and the application management units can communicate with each other, thereby effectively improving communication efficiency.

In view of this, a first aspect of the embodiments of the present application provides a communication method, used for inter-system handover of UE. In this embodiment of the present application, there are a source application system and a target application system. The source application system includes a source control plane device and a source application management unit, and the target application system includes a target control plane device and a target application management unit. If the UE enters a service area of the target application system from a service area of the source application system, after a base station that is serving the UE receives a measurement report obtained by the UE by measuring a surrounding base station, a base station with a better signal is selected to continue to serve the UE, to trigger inter-system handover of the UE. A network device obtains a source system identifier of the source application system and/or a target system identifier of the target application system, and the network device sends the source system identifier to the target application management unit, or sends the target system identifier to the source application management unit.

It can be learned that, the network device obtains the source system identifier and/or the target system identifier, and sends the target system identifier to the source application management unit, or sends the source system identifier to the target application management unit, so that a connection can be established between the source application management unit in the source application system and the target application management unit in the target application system, and the source application management unit and the target application management unit can directly communicate with each other without requiring a third party to perform forwarding, thereby improving communication efficiency.

With reference to the first aspect, in one embodiment, the network device may be a capability exposure platform. In some application systems, for safety reasons, a control plane device and an application management unit in a same application system cannot directly interact with each other, but communicate with each other by using the capability exposure platform. In this implementation, the source control plane device cannot directly communicate with the source application management unit, the target control plane device cannot communicate with the target application management unit, and the capability exposure platform obtains the source system identifier of the source application system and the target system identifier of the target application system. Because the capability exposure platform has both the source system identifier and the target system identifier, the capability exposure platform may send the source system identifier to the target application management unit in the target application system, and may also send the target system identifier to the source application management unit in the source application system.

It can be learned that, if the network device is the capability exposure platform, a problem that a control plene device and an application management unit cannot directly interact with each other can be resolved.

In one embodiment, the capability exposure platform obtains the source system identifier of the source application system may be: After the source control plane device obtains the source system identifier, the capability exposure platform receives the source system identifier of the source application system that is sent by the source control plane device.

It can be learned that, the capability exposure platform receives the source system identifier sent by the source control plane device, so that workload of actively determining the source system identifier by the capability exposure platform can be reduced, thereby improving efficiency of the capability exposure platform.

In one embodiment, the capability exposure platform obtains the target system identifier of the target application system may be: The capability exposure platform receives the target system identifier sent by the target control plane device; or the capability exposure platform receives location information of the UE that is sent by the source control plane device. Because the UE has entered the service area of the target application system, the location information of the UE corresponds to the service area of the target application system. The capability exposure platform presets application system information, and the application system information includes service area information and system identifier information of an application system. The capability exposure platform matches the location information of the UE with preset service area information of an application system, to determine that a location of the UE belongs to the service area of the target application system, so that the target system identifier is determined.

It can be learned that, the capability exposure platform may not only receive the target system identifier sent by the target control plane device, but may also determine the target system identifier based on the location information of the UE that is sent by the source control plane device, thereby providing more implementations for this embodiment of the present application.

With reference to the first aspect, in one embodiment, the network device includes the source control plane device in the source application system, and if the network device is the source control plane device in the source application system, the source control plane device obtains the source system identifier of the source application system, and the source control plane device sends the source system identifier to the target application management unit in the target application system.

It can be learned that, if the network device is the source control plane device, the source control plane device obtains the source system identifier, and sends the source system identifier to the target application management unit, so that a connection is established between the application management units, and the application management units communicate with each other without requiring a third party to perform forwarding, thereby improving communication efficiency.

In one embodiment, the source control plane device obtains the source system identifier of the source application system may be: The source control plane device receives a user plane report of the UE, and may obtain a destination IP address of the UE from the user plane report, and the source control plane device obtains the source system identifier of the source application system based on the destination IP address and configuration information.

It can be learned that, the source control plane device may determine the source system identifier of the source application system by using the user plane report and the configuration information, and the source control plane device can obtain the source system identifier based on existing data, so that processing efficiency is high.

In one embodiment, the source control plane device sends the source system identifier to the target application management unit in the target application system may be: The source control plane device sends the source system identifier to the target application management unit by using a target control plane device, to be specific, the source control plane device first sends the source system identifier to the target control plane device, and then the target control plane device sends the source system identifier to the target application management unit.

It can be learned that the source control plane device may send the source system identifier to the target application management unit by using the target control plane device, thereby resolving a problem that the source control plane device cannot directly communicate with the target application management unit.

In one embodiment, the network device is the source control plane device in the source application system, the source control plane device obtains the target system identifier of the target application system, and the source control plane device sends the target system identifier to the source application management unit in the source application system.

It can be learned that, if the network device is the source control plane device, the source control plane device may obtain the target system identifier, and send the target system identifier to the source application management unit, so that more implementations can be provided for this embodiment of the present application.

In one embodiment, the source control plane device obtains the target system identifier of the target application system may be: The source control plane device determines the target system identifier of the target application system based on location information of the UE and preset application system information. Because the UE has entered the service area of the target application system, the location information of the UE corresponds to the service area of the target application system. The application system information preset by the source control plane device includes service area information and system identifier information of an application system. The source control plane device matches the location information of the UE with preset service area information of an application system, to determine that a location of the UE belongs to the service area of the target application system, so that the target system identifier is determined.

It can be learned that the source control plane device determines the target system identifier of the target application system based on the location information of the UE and the preset application system information, so that more implementations can be provided for this embodiment of the present application.

With reference to the first aspect, in one embodiment, the network device includes the target control plane device in the target application system, and if the network device is the target control plane device in the target application system, the target control plane device obtains the source system identifier of the source application system, and the target control plane device sends the source system identifier to the target application management unit in the target application system.

It can be learned that, if the network device is the target control plane device in the target application system, more implementations can be provided for this embodiment of the present application.

In one embodiment, the target control plane device obtains the source system identifier may be: The target control plane device receives a service network identifier (SN ID) of the source application system that is sent by the source control plane device, where the SN ID is an identifier used by an operator to identify an application system in a scenario in which only one application system is deployed in a PLMN network. It should be noted that the SN ID is a name for a UE side, and is also referred to as a public land mobile network identifier (PLMN ID) for an operator side. If only one application system is deployed in the PLMN network, an SN ID of the application system is a unique identifier corresponding to a system identifier of the application system. The target control plane device presets a correspondence between an SN ID and a system identifier of an application system, and therefore the target control plane device may determine the source system identifier based on the received SN ID of the source application system.

It can be learned that the target control plane device determines the source system identifier by receiving the SN ID of the source application system that is sent by the source control plane device, so that implementations of this embodiment of the present application can be enriched.

In one embodiment, the source system identifier includes an address of the source application management unit or a unique identifier of the source application system. Likewise, the target system identifier includes an address of the target application management unit or a unique identifier of the target application system.

It can be learned that the system identifier has at least two possible forms, so that implementations of this embodiment of the present application are enriched.

In one embodiment, the source application management unit includes an AS controller or a MEC orchestrator, and the target application management unit includes an AS controller or a MEC orchestrator.

It can be learned that the application management unit includes at least two devices, so that implementations of this embodiment of the present application are enriched.

According to a second aspect, an embodiment of the present application provides a communication method, used for inter-system handover of UE. If a location of the UE changes, for example, transfers from a service area of a first application system to a service area of a second application system, or transfers from a service area of a second application system to a service area of a first application system, in other words, the first application system can be used as a source application system and a target application system, where the first application system includes a first application management unit, and the second application system includes a second application management unit, the first application management unit receives a system identifier of the second application system that is sent by a network device, and the first application management unit establishes a connection to the second application management unit based on the system identifier.

It can be learned that, after receiving the system identifier, the first application management unit can establish the connection to the second application management unit based on the system identifier, and the first application management unit and the second application management unit can directly communicate with each other without requiring a third party to perform forwarding, thereby improving communication efficiency.

In one embodiment, the system identifier includes an address of the second application management unit or a unique identifier of the second application system.

It can be learned that the system identifier has at least two possible forms, so that implementations of this embodiment of the present application are enriched.

In one embodiment, the system identifier is the unique identifier of the second application system. The first application management unit presets a correspondence, where the correspondence is a correspondence between a unique identifier of an application system and an address of an application management unit in the application system; the first application management unit determines the address of the second application management unit based on the unique identifier of the second application system and the preset correspondence; and the first application management unit establishes the connection to the second application management unit based on the address of the second application management unit.

It can be learned that, if the system identifier is the unique identifier of the second application system, the first application management unit needs to further determine the address of the second application management unit based on the preset correspondence and the unique identifier of the second application system, and then establish the connection to the second application management unit, so that implementations of this embodiment of the present application are enriched.

In one embodiment, the first application management unit is used as a target application management unit, and after the first application management unit establishes the connection to the second application management unit based on the system identifier, the first application management unit and the second application management unit communicate with each other, including: The first application management unit obtains application information of the UE from the second application management unit, the first application management unit determines application target location information of the UE based on the application information of the UE, and the first application management unit sends the application target location information to the second application management unit.

Alternatively, the first application management unit is used as a source application management unit, and after the first application management unit establishes the connection to the second application management unit based on the system identifier, the first application management unit and the second application management unit communicate with each other, including: The first application management unit sends application information of the UE and location information of the UE to the second application management unit, so that the second application management unit determines application target location information of the UE based on the application information of the UE and the location information of the UE; and the first application management unit receives the application target location information sent by the second application management unit.

It can be learned that, after the connection is established between the first application management unit and the second application management unit, there is further a process of communicating with each other, thereby further improving implementability of this solution.

In one embodiment, the first application management unit includes an AS controller or a MEC orchestrator, and the second application management unit includes an AS controller or a MEC orchestrator.

It can be learned that the application management unit includes at least two devices, so that implementations of this embodiment of the present application are enriched.

According to a third aspect, an embodiment of the present application further provides a network device, including: a first obtaining unit, configured to obtain a source system identifier of a source application system and/or a target system identifier of a target application system; and a first sending unit, configured to send the source system identifier obtained by the first obtaining unit to a target application management unit in the target application system, or send the target system identifier obtained by the first obtaining unit to a source application management unit in the source application system.

It can be learned that, the first obtaining unit of the network device obtains the source system identifier and/or the target system identifier, and then the first sending unit sends the target system identifier to the source application management unit, or sends the source system identifier to the target application management unit, so that a connection can be established between the source application management unit in the source application system and the target application management unit in the target application system, and the source application management unit and the target application management unit can directly communicate with each other without requiring a third party to perform forwarding, thereby improving communication efficiency.

With reference to the third aspect, in one embodiment, the network device includes a capability exposure platform. In some application systems, for safety reasons, a control plane device cannot directly interact with an application management unit, but indirectly communicate with each other by using the capability exposure platform. In this implementation, a source control plane device cannot directly communicate with the source application management unit, and a target control plane device cannot directly communicate with the target application management unit. If the network device is the capability exposure platform, the first obtaining unit is configured to obtain the source system identifier of the source application system and the target system identifier of the target application system, and the first sending unit is configured to send the source system identifier obtained by the first obtaining unit to the target application management unit, or is configured to send the target system identifier obtained by the first obtaining unit to the source application management unit.

It can be learned that, if the network device is the capability exposure platform, a problem that a control plane device and an application management unit cannot directly interact with each other can be resolved.

In one embodiment, the first obtaining unit of the capability exposure platform includes a first receiving module, configured to receive the source system identifier sent by a source control plane device in the source application system.

It can be learned that, the capability exposure platform receives the source system identifier sent by the source control plane device, so that workload of actively determining the source system identifier by the capability exposure platform can be reduced, thereby improving efficiency of the capability exposure platform.

In one embodiment, the first obtaining unit of the capability exposure platform further includes a third receiving module or a second receiving module and a first determining module. The third receiving module is configured to receive the target system identifier sent by the target control plane device; or the second receiving module is configured to receive location information of the UE that is sent by the source control plane device. Because the UE has entered a service area of the target application system, the location information corresponds to the service area of the target application system. The capability exposure platform presets application system information, and the application system information includes service area information and system identifier information of an application system. Then the first determining module determines the target system identifier of the target application system based on the location information and the preset application system information.

It can be learned that, the third receiving module of the capability exposure platform may receive the target system identifier sent by the target control plane device, and a direct receiving manner can improve efficiency of the capability exposure platform. Alternatively, the second receiving module may receive the location information of the UE that is sent by the source control plane device, and then the first determining module actively determines the target system identifier. Both manners provide more implementations for this embodiment of the present application.

With reference to the third aspect, in one embodiment, the network device includes the source control plane device in the source application system, and if the network device is the source control plane device in the source application system, the first obtaining unit is configured to obtain the source system identifier, and the first sending unit is configured to send the source system identifier obtained by the first obtaining unit to the target application management unit.

It can be learned that, if the network device is the source control plane device, the source control plane device obtains the source system identifier, and sends the source system identifier to the target application management unit, so that more implementations can be provided for this embodiment of the present application.

In one embodiment, the first obtaining unit of the source control plane device includes: an obtaining module, configured to obtain a destination IP address of the UE from a user plane report; and a second determining module, configured to determine the source system identifier based on the destination IP address obtained by the obtaining module and configuration information.

It can be learned that, the source control plane device determines the source system identifier of the source application system by using the obtaining module and the second determining module, and the source system identifier is existing data of the control plane device, and therefore processing efficiency is high.

In one embodiment, the first sending unit of the source control plane device includes a first sending module, configured to send the source system identifier to the target application management unit by using the target control plane device.

It can be learned that the first sending module of the source control plane device may send the source system identifier to the target application management unit by using the target control plane device, thereby resolving a problem that the source control plane device cannot directly communicate with the target application management unit.

With reference to the third aspect, in one embodiment, the network device includes the source control plane device in the source application system, and if the network device is the source control plane device in the source application system, the first obtaining unit is configured to obtain the target system identifier, and the first sending unit is configured to send the target system identifier obtained by the first obtaining unit to the source application management unit.

It can be learned that, if the network device is the source control plane device, the source control plane device may obtain the target system identifier, and the first sending unit sends the target system identifier to the source application management unit, so that more implementations can be provided for this embodiment of the present application.

In one embodiment, the first obtaining unit of the source control plane device includes a third determining module, configured to determine the target system identifier based on location information of the UE and preset application system information. The application system information includes service area information and system identifier information of an application system, and the location information corresponds to the service area of the target application system.

It can be learned that the third determining module of the source control plane device determines the target system identifier based on the location information of the UE and the preset application system information, so that more implementations can be provided for this embodiment of the present application.

With reference to the third aspect, in a ninth possible implementation of the third aspect, the network device includes the target control plane device, and if the network device is the target control plane device, the first obtaining unit is configured to obtain the source system identifier, and the first sending unit is configured to send the source system identifier obtained by the first obtaining unit to the target application management unit.

It can be learned that, if the network device is the target control plane device in the target application system, more implementations can be provided for this embodiment of the present application.

In one embodiment, the first obtaining unit of the target control plane device includes a fourth receiving module, configured to receive an SN ID of the source application system that is sent by the source control plane device, and further includes a fourth determining module, configured to determine the source system identifier based on a preset SN ID correspondence and the SN ID of the source application system that is received by the fourth receiving module, where the SN ID correspondence is a correspondence between an SN ID and a system identifier of an application system.

It can be learned that, the target control plane device receives, by using the fourth receiving module, the SN ID sent by the source control plane device, and then the fourth determining module determines the source system identifier, so that implementations of this embodiment of the present application can be enriched.

In one embodiment, the source system identifier includes an address of the source application management unit or a unique identifier of the source application system. Likewise, the target system identifier includes an address of the target application management unit or a unique identifier of the target application system.

It can be learned that the system identifier has at least two possible forms, so that implementations of this embodiment of the present application are enriched.

In one embodiment, the source application management unit includes an AS controller or a MEC orchestrator, and likewise, the target application management unit includes an AS controller or a MEC orchestrator.

It can be learned that the application management unit includes at least two devices, so that implementations of this embodiment of the present application are enriched.

According to a fourth aspect, an embodiment of the present application provides an application management unit, used for inter-system handover of UE. The application management unit is used as a first application management unit in a first application system, the first application management unit includes a first receiving unit, configured to receive a system identifier of a second application system that is sent by a network device, and the first application management unit further includes a connection unit, configured to establish a connection to a second application management unit in the second application system based on the system identifier received by the first receiving unit.

It can be learned that, after the first receiving unit of third application management receives the system identifier, the connection unit can establish the connection to the first application management unit based on the system identifier, so that the first application management unit and the second application management unit directly communicate with each other without requiring a third party to perform forwarding, thereby improving communication efficiency.

In one embodiment, the system identifier includes an address of the second application management unit or a unique identifier of the second application system.

It can be learned that the system identifier has at least two possible forms, so that implementations of this embodiment of the present application are enriched.

In one embodiment, the system identifier is the unique identifier of the second application system. The connection unit includes a fifth determining module, configured to determine the address of the second application management unit based on the unique identifier of the second application system and a preset correspondence, where the correspondence is a correspondence between a unique identifier of an application system and an address of an application management unit in the application system. The first application management unit further includes a connection module, configured to establish the connection to the second application management unit based on the address that is of the second application management unit and that is determined by the fifth determining module.

It can be learned that, if the system identifier is the unique identifier of the second application system, the fifth determining module of the first application management unit needs to further determine the address of the second application management unit based on the correspondence and the unique identifier of the second application system, and then the connection module establishes the connection to the second application management unit, so that implementations of this embodiment of the present application are enriched.

In one embodiment, the first application management unit is used as a target application management unit. The first application management unit includes a second obtaining unit, configured to obtain application information of the UE from the second application management unit. The first application management unit further includes a determining unit, configured to determine application target location information of the UE based on the application information of the UE. The first application management unit further includes a second sending unit, configured to send the application target location information determined by the determining unit to the second application management unit.

Alternatively, the first application management unit is used as a source application management unit. The first application management unit further includes a third sending unit, configured to send application information of the UE and location information of the UE to the second application management unit, so that the second application management unit determines application target location information of the UE based on the application information of the UE and the location information of the UE. The first application management unit further includes a second receiving unit, configured to receive the application target location information sent by the second application management unit.

It can be learned that, after the connection is established between the first application management unit and the second application management unit, there is further a process of communicating with each other, thereby further improving implementability of this solution.

In one embodiment, the first application management unit includes an AS controller or a MEC orchestrator, and likewise, the second application management unit includes an AS controller or a MEC orchestrator.

It can be learned that the application management unit includes at least two devices, so that implementations of this embodiment of the present application are enriched.

According to a fifth aspect, an embodiment of the present application provides a network device, used for inter-system handover of UE. The network device includes a central processing unit, an input/output interface, a storage medium, and a memory, and by invoking an operation instruction stored in the storage medium, the central processing unit is configured to perform the following operations:

obtaining a source system identifier of a source application system and/or a target system identifier of a target application system, and sending the source system identifier to a target application management unit in the target application system, or sending the target system identifier to a source application management unit in the source application system.

It can be learned that, the network device obtains the source system identifier and/or the target system identifier, and sends the target system identifier to the source application management unit, or sends the source system identifier to the target application management unit, so that a connection can be established between the source application management unit in the source application system and the target application management unit in the target application system, and the source application management unit and the target application management unit can directly communicate with each other without requiring a third party to perform forwarding, thereby improving communication efficiency.

According to a sixth aspect, an embodiment of the present application further provides an application management unit, used for inter-system handover of UE. The application management unit is used as a first application management unit in a first application system, the application management unit includes a central processing unit, an input/output interface, a storage medium, and a memory, and by invoking an operation instruction stored in the storage medium, the central processing unit is configured to perform the following operations:

receiving a system identifier of a second application system that is sent by a network device, and establishing, by the first application management unit, a connection to a second application management unit in the second application system based on the system identifier.

It can be learned that, after receiving the system identifier, third application management can establish the connection to the first application management unit based on the system identifier, and the third application management and the first application management unit can directly communicate with each other without requiring a third party to perform forwarding, thereby improving communication efficiency.

It can be learned from the foregoing technical solutions that the embodiments of the present application have the following advantages:

The network device obtains the source system identifier of the source application system and/or the target system identifier of the target application system, and the network device sends the source system identifier to the target application management unit, or sends the target system identifier to the source application management unit. The connection is established between the application management units by using the system identifier, and the application management units directly communicate with each other without requiring a third party to perform forwarding, thereby effectively improving communication efficiency.

DESCRIPTION OF EMBODIMENTS

Embodiments of the present application provide a communication method and a device, which are used for inter-system handover of UE, so that a connection can be established between application management units, and the application management units can communicate with each other, thereby effectively improving communication efficiency.

The following clearly describes the technical solutions in the embodiments of the present application with reference to the accompanying drawings in the embodiments of the present application. Apparently, the described embodiments are merely some but not all of the embodiments of the present application. All other embodiments obtained by persons skilled in the art based on the embodiments of the present application without creative efforts shall fall within the protection scope of the present application.

In the specification, claims, and accompanying drawings of the present application, the terms "first", "second", "third", "fourth", and so on (if any) are intended to distinguish between similar objects but do not necessarily indicate a specific order or sequence. It should be understood that the data termed in such a way are interchangeable in proper circumstances, so that the embodiments of the present application described herein can be implemented in other orders than the order illustrated or described herein. Moreover, the terms "include", "contain", and any other variants mean to cover the non-exclusive inclusion, for example, a process, method, system, product, or device that includes a list of operations or units is not necessarily limited to those listed operations or units, but may include other operations or units not expressly listed or inherent to such a process, method, system, product, or device.

Figure 1A:
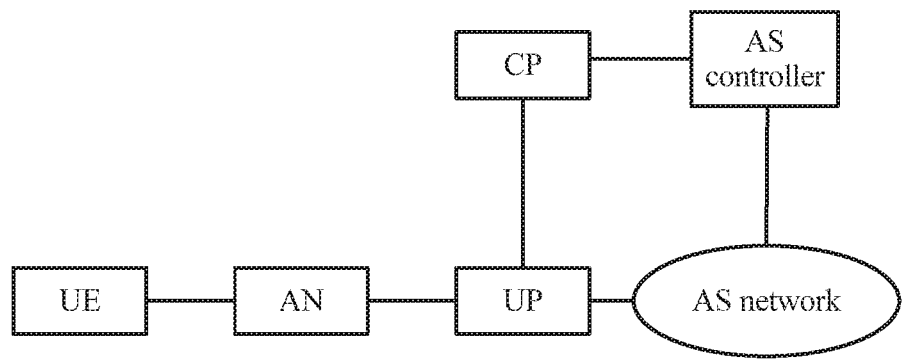
FIG. 1a is a schematic diagram of a user plane reselection architecture of a next-generation mobile network.

In the 3GPP standards, one user plane reselection architecture of a next-generation mobile network is shown in FIG. 1a, and includes user equipment (UE), an access network (AN) device, a user plane (UP) device, a control plane (CP) device, an application controller (AS controller, Application Server controller), and an application network (AS network, Application Server network). The control plane device is responsible for mobile network management, and the user plane device is responsible for service data transmission. The application controller is an application management unit, and the application controller is used as an example in the figure for description. The application management unit is usually located in a trusted zone of an operator and is responsible for application management in an application network, such as application migration, application instantiation, application network configuration, application termination, or resource maintenance. The application management unit may further interact with a control plane and transfer application-related information, such as an application location, an application status, or an application migration event, to help the control plane select an optimal transmission path in the mobile network. The application management unit can also obtain information from the control plane, and optimize application management. The application management unit includes an application controller or an edge computing orchestrator. The application network and the application management unit form a local application system, or the local application system is referred to as an edge application system. The application management unit is a unique management entity in the application system. An operator of the application system plays a plurality of roles. First, the application system may be operated by a service provider and contracted to an individual, for example, each region, the individual is responsible for locations such as a village, a township, a community, a company, and a campus, and a plurality of service providers and network operators jointly deploy a local application system. Second, the application system may alternatively be operated by a virtual operator in cooperation with a local service provider and a network operator. Third, a network operator may also deploy a local AS network, and provide a local application.

It should be noted that, in some application systems, for safety reasons or the like, a control plane device and an application management unit in a same application system cannot directly communicate with each other, and information is exchanged between the control plane device and the application management unit by using a capability exposure platform.

An application system operator may be an individual, a virtual operator, a service operator, a network operator, or the like, and an application network of the application system operator can serve only limited areas. Therefore, there are the following two scenarios: A plurality of application systems in a PLMN network provide services; and only one application system is deployed in a PLMN network to provide a service.

Figure 1B:
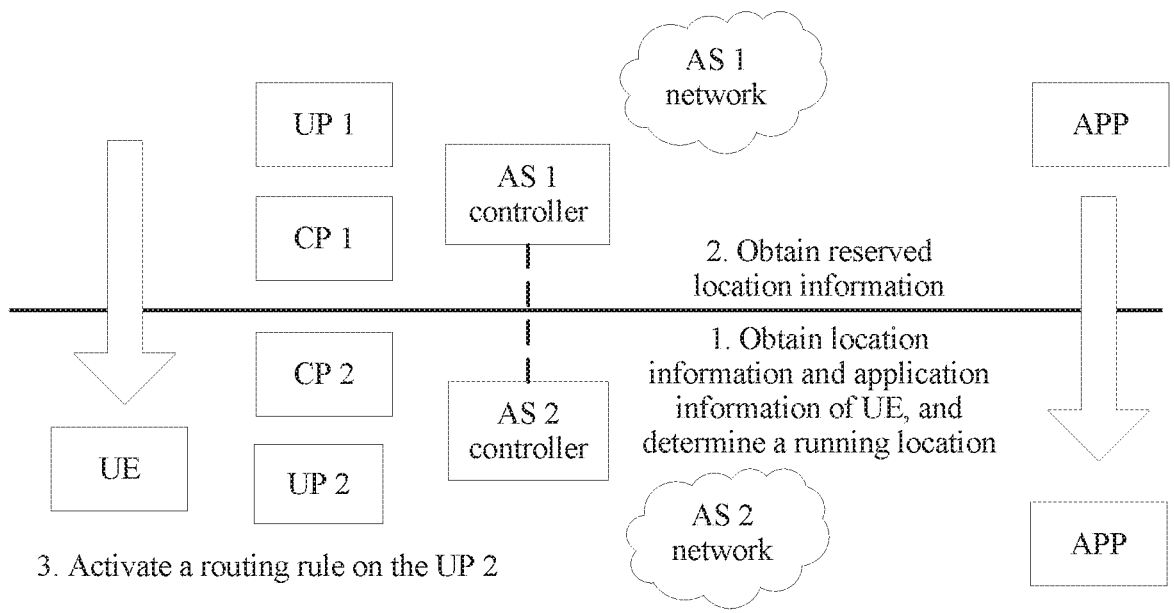
FIG. 1b is a schematic diagram of inter-system handover of UE.

In inter-system handover of UE, as shown in FIG. 1b, the UE moves from a service area of an application network 1 of an application system (referred to as a source application system below) to a service area of an application network 2 of another application system (referred to as a target application system below). To enable a user to get good service experience anywhere at any time, the UE performs inter-system handover, to be specific, is handed over from the source application system to the target application system. In a handover process of the UE, a target application management unit needs to obtain location information and application information of the UE, and determine a location of an application in the target application system; then, a source application management unit needs to obtain a location reserved by the target application management unit for the application, and trigger application migration; and finally, after preparation of the application in the target application system is completed, a local offloading rule of a target user plane is activated. In the prior art, two application management units cannot directly communicate with each other, but can only communicate through forwarding performed by a third party, and therefore communication efficiency is relatively low.

Embodiments of the present application are to resolve a prior-art problem that two application management units cannot directly communicate with each other in a scenario of inter-system handover of UE. In a network environment of the embodiments of the present application, there are a source application system and a target application system. The source application system includes a source user plane device, a source control plane device, and a source application management unit, and the target application system includes a target user plane device, a target control plane device, and a target application management unit. The UE needs to perform inter-system handover before entering a service area of the target application system from a service area of the source application system.

Figure 2A:
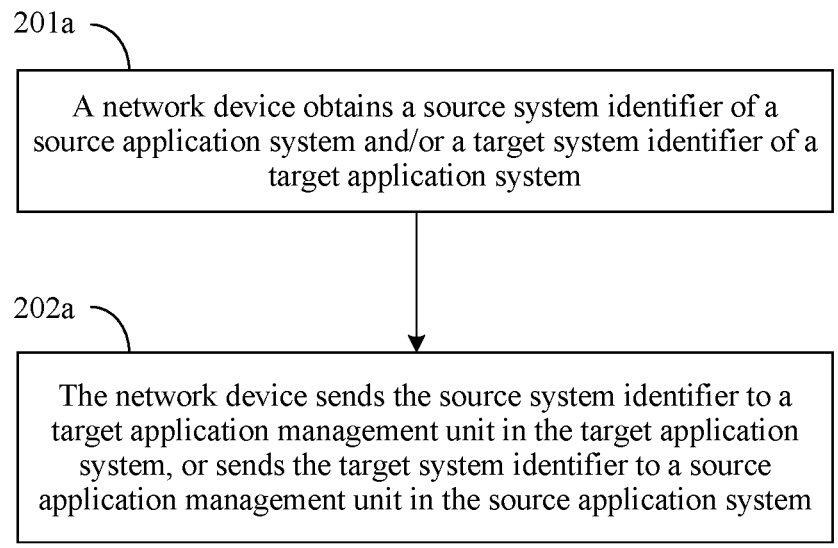
FIG. 2a is a flowchart of a communication method according to an embodiment of the present application.

As shown in FIG. 2a, an embodiment of the present application provides a communication method, and the method is performed by a network device. Details are as follows:

Operation 201a. The network device obtains a source system identifier of a source application system and/or a target system identifier of a target application system.

The source system identifier may be an address of a source application management unit or a unique identifier of the source application system, and the target system identifier may be an address of a target application management unit or a unique identifier of the target application system. This description is used for all source system identifiers and target system identifiers mentioned below. Details are not described.

Operation 202a. The network device sends the source system identifier to a target application management unit in the target application system, or sends the target system identifier to a source application management unit in the source application system.

It should be noted that the network device may be a capability exposure platform, a source control plane device in the source application system, or a target control plane device in the target application system. The source control plane device and the target control plane device each may include at least one of a mobility management function unit, a mobility management function entity, a session management function unit, and a session management function unit. This description is used for all source control plane devices and target control plane devices mentioned below, and details are not described.

The source application management unit may be an AS controller or a MEC orchestrator, and the target application management unit may be an AS controller or a MEC orchestrator. This description is used for all source application management units and target application management units mentioned below, and details are not described.

In this embodiment, the network device obtains the source system identifier of the source application system and/or the target system identifier of the target application system, and the network device sends the source system identifier to the target application management unit in the target application system, or sends the target system identifier to the source application management unit in the source application system, so that after receiving a system identifier of a peer end, the source application management unit or the target application management unit can perform addressing based on the system identifier, and establish a connection to the peer end, to communicate with the peer end, thereby effectively improving communication efficiency.

Figure 2B:
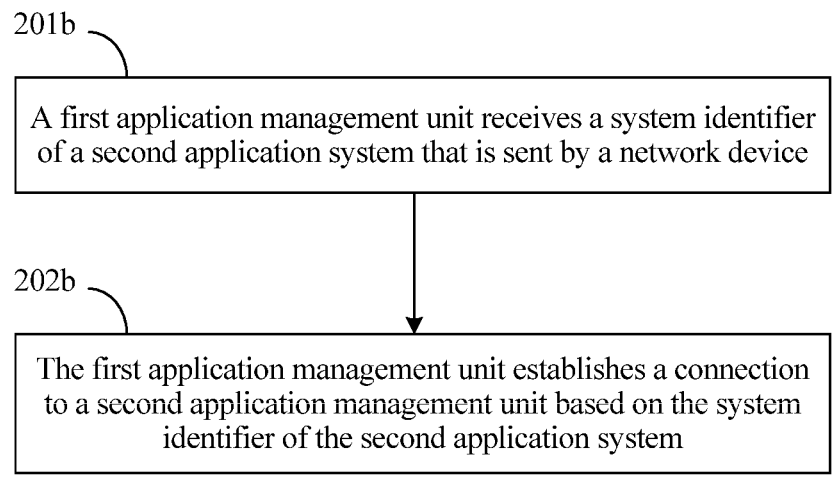
FIG. 2b is a flowchart of another communication method according to an embodiment of the present application.

As shown in FIG. 2b, an embodiment of the present application provides another communication method. The method is used for inter-system handover of UE. Details are as follows:

Operation 201b. A first application management unit receives a system identifier of a second application system that is sent by a network device.

The system identifier includes an address of a second application management unit in the second application system or a unique identifier of the second application system.

The first application management unit in a first application system may be a target application management unit, and the system identifier of the second application system may be a source system identifier. Alternatively, the first application management unit may be a source application management unit, and the system identifier of the second application system may be a target system identifier.

In one embodiment, for obtaining of the system identifier of the second application system, refer to operations 201a and 202a in FIG. 2a. Details are not described again.

Operation 202b. The first application management unit establishes a connection to a second application management unit based on the system identifier of the second application system.

In one embodiment, if the system identifier is the address of the second application management unit, the first application management unit may address the second application management unit based on the address of the second application management unit, and establish the connection. If the system identifier is the unique identifier of the second application system, the first application management unit determines the address of the second application management unit based on the unique identifier of the second application system and a preset correspondence, and then addresses the second application management unit based on the address of the second application management unit, and establishes the connection.

The preset correspondence may be a correspondence between a unique identifier of an application system and an address of an application management unit in the application system.

In addition, if the first application management unit is the target application management unit, and the system identifier is the source system identifier, the second application management unit is a source application system management unit. If the first application management unit is the source application management unit, and the system identifier is the target system identifier, the second application management unit is a target application management unit.

In one embodiment, the first application management unit is the target application management unit, and after operation 202b, the method further includes:

the first application management unit obtains application information of the UE from the second application management unit;

the first application management unit determines application target location information of the UE based on the application information of the UE; and the first application management unit sends the application target location information to the second application management unit.

In one embodiment, the first application management unit is the source application management unit, and after operation 202b, the method further includes:

the first application management unit sends application information of the UE and location information of the UE to the second application management unit, so that the second application management unit determines application target location information of the UE based on the application information of the UE and the location information of the UE; and the first application management unit receives the application target location information sent by the second application management unit.

It should be noted that the first application management unit and the second application management unit in this embodiment each may be an AS controller or a MEC orchestrator. This description is used for all first application management units and second application management units below, and details are not described.

In this embodiment, the first application management unit receives the system identifier sent by the network device, and establishes the connection to the second application management unit, so that the first application management unit and the second application management unit can directly communicate with each other, thereby improving communication efficiency.

Figure 3:
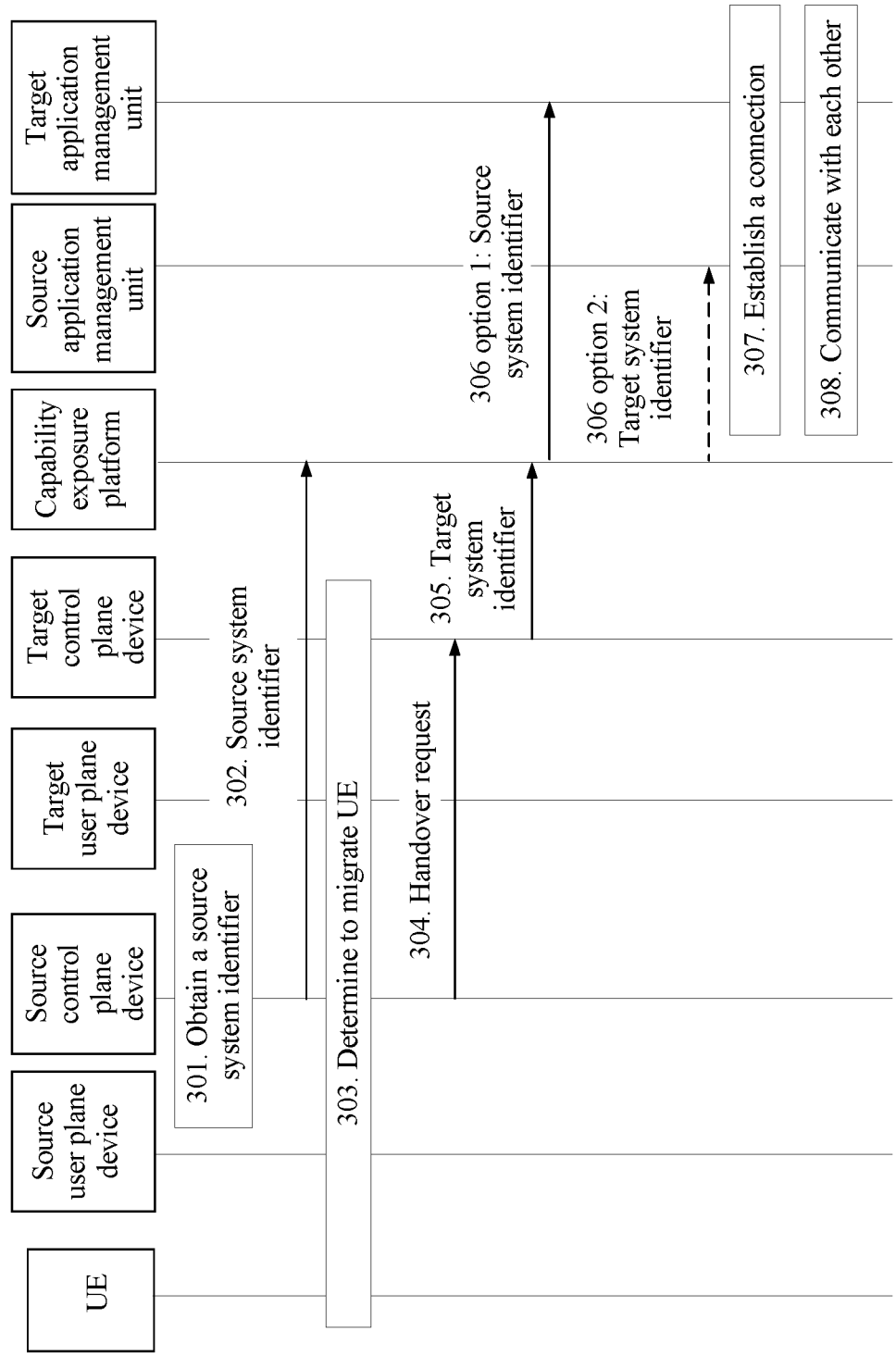
FIG. 3 is a flowchart of another communication method according to an embodiment of the present application.
Figure 4:
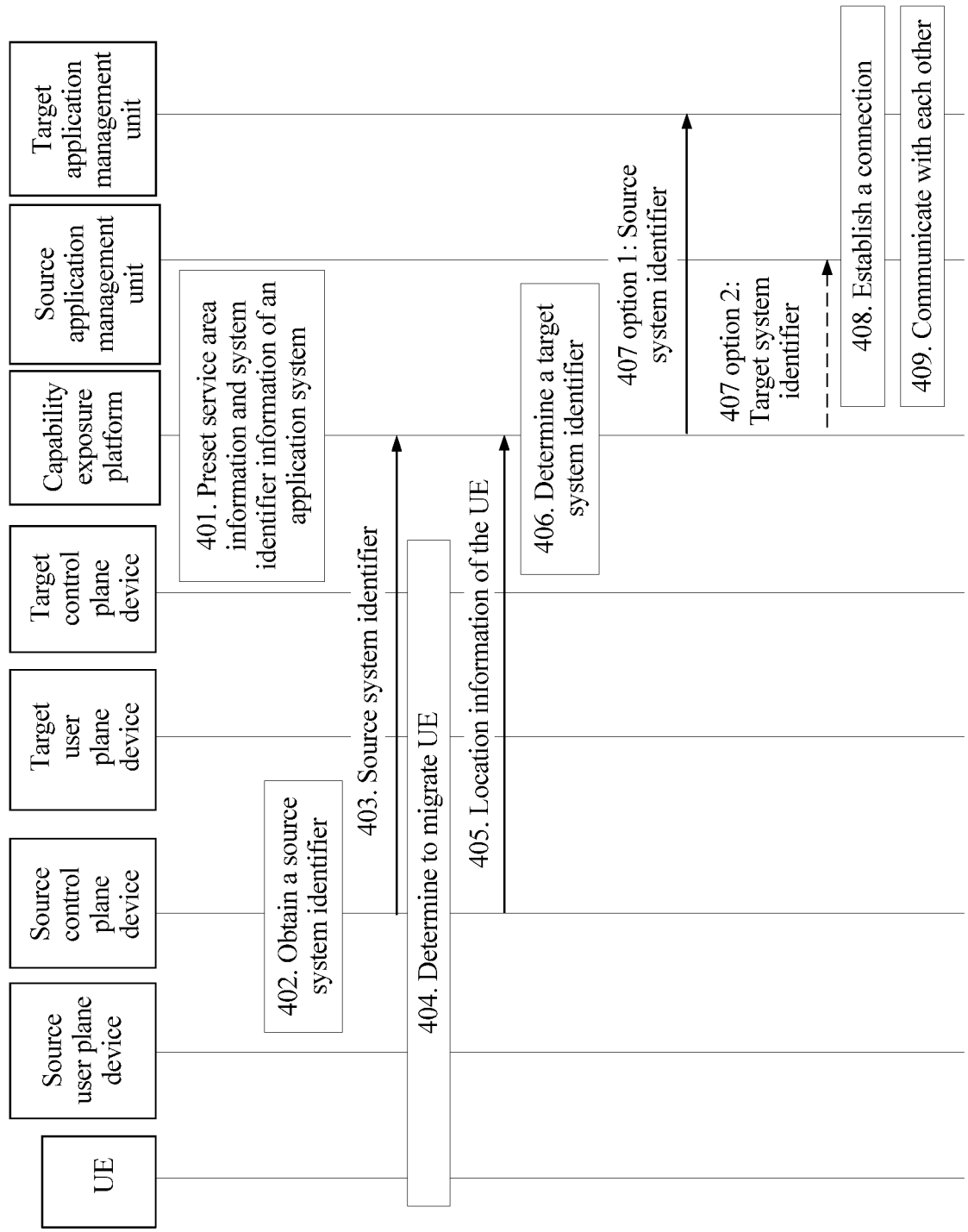
FIG. 4 is a flowchart of another communication method according to an embodiment of the present application.

It should be further noted that, in some possible embodiments, after the connection is established between the first application management unit and the second application management unit, a process of communicating with each other is further included. In one embodiment, if the first application management unit is the target application management unit, a process in which the first application management unit and the second application management unit communicate with each other is similar to operation 308 when 306 option 1 is performed in FIG. 3, is similar to operation 409 when 407 option 1 is performed in FIG. 4, is similar to operation 506 in FIG. 5, and is similar to operation 707 in FIG. 7. Details are not described.

Figure 6:
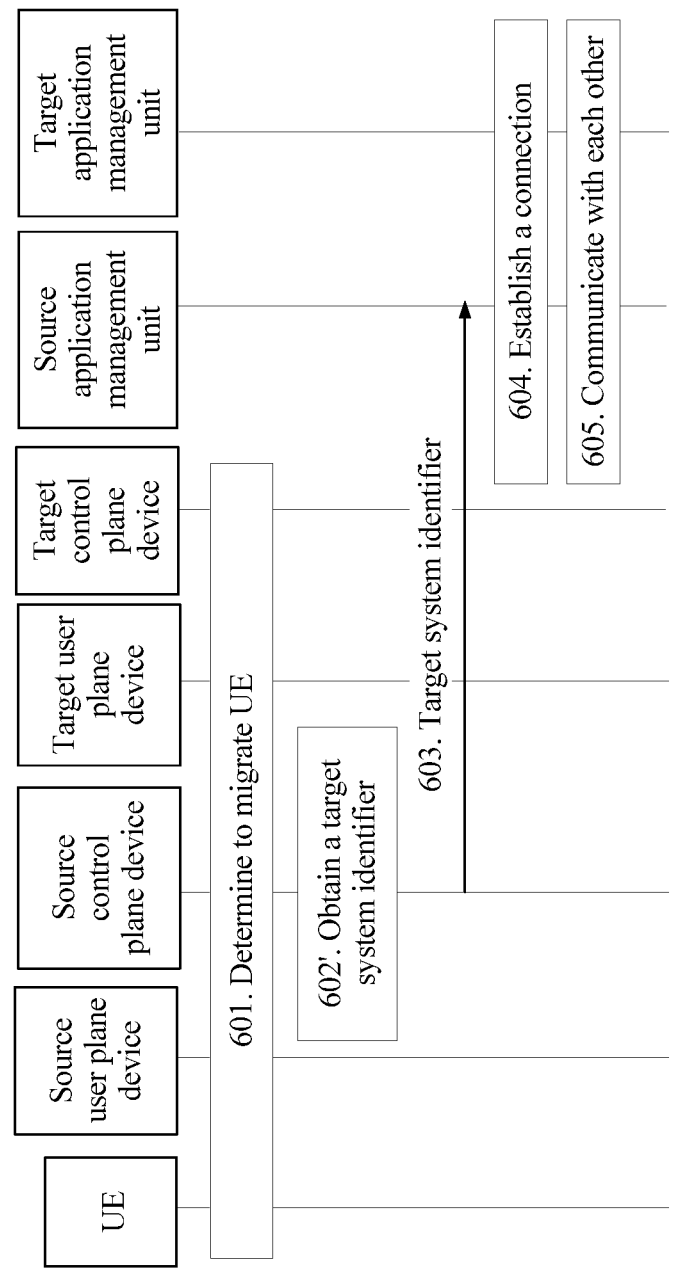
FIG. 6 is a flowchart of another communication method according to an embodiment of the present application.

If the first application management unit is the source application management unit, a process in which the first application management unit and the second application management unit communicate with each other is similar to operation 308 when 306 option 2 is performed in FIG. 3, is similar to operation 409 when operation 407 option 2 is performed in FIG. 4, and is similar to operation 605 in FIG. 6. Details are not described.

For ease of understanding, an embodiment of the communication method in this embodiment of the present application is described in detail below with reference to FIG. 2c. This embodiment includes three cases: a, b, and c.

The case a includes the following operations.

Operation 201'c. A network device obtains a source system identifier.

Operation 202'c. The network device sends the source system identifier to a target application management unit.

Correspondingly, the target application management unit receives the source system identifier sent by the network device, and the target application management unit may include an AS controller or a MEC orchestrator.

Operation 203. A source application management unit establishes a connection to the target application management unit.

For an implementation of operation 203, refer to operation 202b.

In one embodiment, in operation 203, if the source system identifier is an address of the source application management unit, the target application management unit may address the source application management unit based on the address of the source application management unit, and establish the connection. If the source system identifier is a unique identifier of a source application system, the target application management unit may determine an address of the source application management unit based on the unique identifier of the source application system, and then address the source application management unit based on the address of the source application management unit, and establish the connection.

It should be noted that the target application management unit may determine the address of the source application management unit based on a preset correspondence and a unique identifier of the source application management unit.

The case b includes the following operations.

Operation 201"c. A network device obtains a target system identifier.

The target system identifier includes an address of a target application management unit in a target application system or a unique identifier of a target application system. Specifically, the unique identifier of the target application system is an identifier that can uniquely indicate the target application system in a mobile network, and the target application management unit may include an AS controller or a MEC orchestrator.

Operation 202"c. The network device sends the target system identifier to a source application management unit.

The source application management unit receives the target system identifier sent by the network device. It should be noted that the source application management unit may include an AS controller or a MEC orchestrator.

Operation 203. The source application management unit establishes a connection to a target application management unit.

For an implementation of operation 203, refer to operation 202b.

In one embodiment, in operation 203, if the target system identifier is the address of the target application management unit, the source application management unit may address the target application management unit based on the address of the target application management unit, and establish the connection. If the target system identifier is the unique identifier of the target application system, the source application management unit determines the address of the target application management unit based on a preset correspondence and the unique identifier of the target application system, and then addresses the target application management unit based on the address of the target application management unit, and establishes the connection, where the preset correspondence is a correspondence between a unique identifier of an application system and an address of an application management unit in the application system.

The case c includes the following operations.

Operation 201'c. A network device obtains a source system identifier and a target system identifier.

It may be understood that the network device has both the source system identifier and the target system identifier. Therefore, the network device can perform operation 202'''c option 1, to be specific, the network device sends the source system identifier to a target application management unit; and can also perform operation 202'''c option 2, to be specific, the network device sends the target system identifier to a source application management unit.

For the source system identifier and the target system identifier, refer to the foregoing related descriptions. Details are not described again.

Operation 202'c option 1: The network device sends the source system identifier to a target application management unit.

Operation 202'c option 1 is similar to operation 202'c, and details are not described herein again.

Operation 202'''c option 2: The network device sends the target system identifier to a source application management unit.

Operation 202'''c option 2 is similar to operation 202"c, and details are not described herein again.

Operation 203. The source application management unit establishes a connection to the target application management unit.

For an implementation of operation 203, refer to operation 202b.

In one embodiment, if 202'c option 1 is performed, the target application management unit establishes a connection to the source application management unit based on the source system identifier in operation 203. In one embodiment, this is similar to operation 203 in the case a, and details are not described again. If operation 202'''c option 2 is performed, the source application management unit establishes the connection to the target application management unit based on the target system identifier in operation 203. In one embodiment, this is similar to operation 203 in the case b, and details are not described again.

It should be noted that, for the network device, the source system identifier, the source application management unit, and the target application management unit, refer to related descriptions in the embodiment shown in FIG. 2a.

The network device may be a capability exposure platform, a source control plane device in a source application system, or a target control plane device in a target application system. The source control plane device and the target control plane device each may include at least one of a mobility management function unit, a mobility management function entity, a session management function unit, and a session management function unit. This description is used for all source control plane devices and target control plane devices mentioned below, and details are not described.

The source application management unit may be an AS controller or a MEC orchestrator, and the target application management unit may be an AS controller or a MEC orchestrator. This description is used for all source application management units and target application management units mentioned below, and details are not described.

The source system identifier may be an address of the source application management unit or a unique identifier of the source application system, and the target system identifier may be an address of the target application management unit or a unique identifier of the target application system. This description is used for all source system identifiers and target system identifiers mentioned below. Details are not described.

In this embodiment, the network device obtains the source system identifier of the source application system and/or the target system identifier of the target application system, and the network device sends the source system identifier to the target application management unit in the target application system, or sends the target system identifier to the source application management unit in the source application system. After receiving the target system identifier, the source application management unit may address the target application management unit, and establish the connection to the target application management unit, so that the source application management unit and the target application management unit communicate with each other. Likewise, after receiving the source system identifier, the target application management unit may address the source application management unit, and establish the connection to the source application management unit, so that the source application management unit and the target application management unit communicate with each other. In this way, communication efficiency is effectively improved.

There are a plurality of implementations for this embodiment of the present application based on different network devices. Descriptions are provided below with reference to an embodiment by using a capability exposure platform as an example of the network device.

In this embodiment, a source control plane device and a source application management unit cannot directly interact with each other, and a target control plane device and a target application management unit cannot directly interact with each other, but indirectly communicate with each other by using a capability exposure platform. When the network device is the capability exposure platform, there are the following cases based on different manners in which the network device obtains a target system identifier.

A. The Capability Exposure Platform Directly Receives a Target System Identifier Sent by a Target Control Plane Device.

Referring to FIG. 3, this embodiment includes the following operations.

Operation 301. A source control plane device obtains a source system identifier.

In one embodiment, the source control plane device may receive a user plane report of UE, and determine a destination IP address of the UE through domain name system (DNS) hijacking, deep packet inspection, or the like. Because the UE is currently using a service of a source application system, the destination IP address corresponds to the source application system. Because configuration information of the source control plane device includes a correspondence between a destination IP address and a system identifier of an application system, the source control plane device may determine the source system identifier of the source application system based on the destination IP address of the UE and the configuration information.

Operation 302. A capability exposure platform receives the source system identifier sent by the source control plane device.

It should be noted that the source control plane device may further send a UE identity ID to the capability exposure platform. The UE ID includes at least one of the following information: UE IP, an international mobile subscriber identity (IMSI), a mobile subscriber number (MSISDN), and a subscribed external account. It may be understood that this description is used for all UE IDs mentioned below, and details are not described.

It should be further noted that the source control plane device may periodically send the source system identifier to the capability exposure platform based on a preset time interval, or may send the source system identifier to the capability exposure platform after receiving a request from the capability exposure platform. This is not limited herein.

Operation 303. Determine to migrate UE.

In one embodiment, the UE periodically measures signal quality of a surrounding base station based on a measurement mechanism, and reports the signal quality to a base station that is serving the UE. To provide a better service for the UE, the base station that is serving the UE determines, based on a preset mechanism, to migrate the UE to another base station. To be specific, in this embodiment, the UE is migrated from a base station in the source application system to a base station in a target application system. This belongs to the prior art, and details are not described.

Operation 304. The source control plane device sends a handover request to a target control plane device.

The handover request may include location information of the UE and the UE ID. In one embodiment, the location information of the UE includes at least one of the following information: a target tracking area identity (TAI), a target eNB ID, and the like. It may be understood that this description is used for all location information of the UE mentioned below, and details are not described.

Operation 305. The capability exposure platform receives a target system identifier sent by the target control plane device.

In one embodiment, after receiving the handover request, the target control plane device selects a new application system for the UE, where the new application system is the target application system in this embodiment; and sends the target system identifier of the target application system to the capability exposure platform. It should be noted that the target control plane device may further send the location information of the UE and the UE ID to the capability exposure platform. The location information of the UE herein further includes user plane gateway ID information.

It should be noted that, in this embodiment, operations 301 and 302 are before operation 303, and in actual implementation, operations 301 and 302 may be after operation 303, operation 304, or operation 305. This is not limited herein.

It may be understood that the capability exposure platform has both the source system identifier and the target system identifier. Therefore, the capability exposure platform may perform the following operation 306 option 1 to send the source system identifier to a target application management unit, or perform operation 306 option 2 to send the target system identifier to a source application management unit.

Operation 306 option 1: The capability exposure platform sends the source system identifier to a target application management unit.

The capability exposure platform obtains the source system identifier and the target system identifier. The capability exposure platform may determine, with reference to UE ID information, that the UE needs to perform inter-system handover, to be specific, the capability exposure platform determines to hand over the UE from the source application system to the target application system. The capability exposure platform sends the source system identifier to the target application management unit. It should be noted that the capability exposure platform may further send the UE ID and the location information of the UE to the target application management unit.

Operation 306 option 2: The capability exposure platform sends the target system identifier to a source application management unit.

It should be noted that the capability exposure platform may further send the UE ID and the location information of the UE to the source application management unit.

Operation 307. The target application management unit establishes a connection to the source application management unit.

If the capability exposure platform performs operation 306 option 1, after the target application management unit receives the source system identifier, if the source system identifier is an address of the source application management unit, the target application management unit performs addressing based on the address of the source application management unit, and establishes a connection to the source application management unit; or if the source system identifier is a unique identifier of the source application system, the target application management unit determines an address of the source application management unit based on a preset correspondence and the source system identifier, and then addresses the source application management unit, and establishes a connection to the source application management unit, where the correspondence is a correspondence between a unique identifier of an application system and an address of an application management unit in the application system.

If the capability exposure platform performs operation 306 option 2, after the source application management unit receives the target system identifier, if the target system identifier is an address of the target application management unit, the source application management unit performs addressing based on the address of the target application management unit, and establishes a connection to the target application management unit; or if the target system identifier is a unique identifier of the target application system, the source application management unit determines an address of the target application management unit based on a preset correspondence and the target system identifier, and then addresses the target application management unit, and establishes a connection to the target application management unit, where the correspondence is a correspondence between a unique identifier of an application system and an address of an application management unit in the application system.

Operation 308. The target application management unit and the source application management unit communicate with each other.

In one embodiment, if the capability exposure platform performs operation 306 option 1, after the target application management unit establishes the connection to the source application management unit, the target application management unit and the source application management unit may communicate with each other, including: The target application management unit receives application information of the UE that is sent by the source application management unit; the target application management unit determines application target location information of the UE based on the application information of the UE and the location information of the UE; the target application management unit sends the application target location information to the source application management unit; and after receiving the application target location information of the UE, the source application management unit triggers application migration, and activates a local offloading rule of a target user plane device after preparation of an application in the target application system is completed.

It may be understood that, if the capability exposure platform performs operation 306 option 2, because the target application management unit does not have the location information of the UE, the source application management unit needs to send the location information of the UE in addition to application information of the UE to the target application management unit. The target application management unit determines application target location information of the UE based on the application information of the UE and the location information of the UE. The target application management unit sends the application target location information to the source application management unit. After receiving the application target location information of the UE, the source application management unit triggers application migration, and activates a local offloading rule of a target user plane device after preparation of an application in the target application system is completed.

In this embodiment, the capability exposure platform receives the source system identifier sent by the source control plane device and receives the target system identifier sent by the target control plane device, and then sends the source system identifier to the target application management unit, or sends the target system identifier to the source application management unit, so that a connection can be established between the application management units, and the application management units can communicate with each other without requiring a third party to perform forwarding, thereby improving communication efficiency.

B. The Capability Exposure Platform Determines a Target System Identifier by Using Location Information of UE.

Referring to FIG. 4, this embodiment includes the following operations.

Operation 401. The capability exposure platform presets service area information and system identifier information of an application system.

It should be noted that the service area information, of the application system, preset by the capability exposure platform includes service area information of a source application system and service area information of a target application system, and the system identifier information includes a system identifier of the source application system and a system identifier of the target application system.

Operation 402. A source control plane device obtains a source system identifier.

Operation 402 is similar to operation 301 in FIG. 3, and details are not described herein again.

Operation 403. The capability exposure platform receives the source system identifier sent by the source control plane device.

Operation 403 is similar to operation 302 in FIG. 3, and details are not described herein again.

Operation 404. Determine to migrate UE.

Operation 404 is similar to operation 303 in FIG. 3, and details are not described herein again.

Operation 405. The capability exposure platform receives location information of the UE that is sent by the source control plane device.

After receiving a handover command, the source control plane device sends the location information of the UE to the capability exposure platform. In this case, the UE has entered a service area of the target application system, and therefore, the location information of the UE corresponds to the target application system.

Operation 406. The capability exposure platform determines a target system identifier.

The capability exposure platform presets the service area information and the system identifier information of the application system. After receiving the location information of the UE, the capability exposure platform may determine the target system identifier of the target application system based on the location information of the UE and the preset service area information and system identifier information of the application system.

It should be noted that, in this embodiment, operations 402 and 403 are before operation 404, and in actual implementation, operations 402 and 403 may be after operation 404, operation 405, or operation 406. This is not limited herein.

It may be understood that the capability exposure platform has both the source system identifier and the target system identifier. Therefore, the capability exposure platform may perform the following operation 407 option 1 to send the source system identifier to a target application management unit, or perform operation 407 option 2 to send the target system identifier to a source application management unit.

Operation 407 option 1: The capability exposure platform sends the source system identifier to a target application management unit.

Operation 407 option 1 is similar to operation 306 option 1 in FIG. 3, and details are not described herein again.

Operation 407 option 2: The capability exposure platform sends the target system identifier to a source application management unit.

Operation 407 option 2 is similar to operation 306 option 2 in FIG. 3, and details are not described herein again.

Operation 408. The target application management unit establishes a connection to the source application management unit.

Operation 408 is similar to operation 307 in FIG. 3, and details are not described herein again.

Operation 409. The target application management unit and the source application management unit communicate with each other.

Operation 409 is similar to operation 308 in FIG. 3, and details are not described herein again.

In this embodiment, the capability exposure platform receives the source system identifier sent by the source control plane device, determines the target system identifier based on the location information of the UE, and then sends the source system identifier to the target application management unit, or sends the target system identifier to the source application management unit, so that a connection can be established between the two management units, and the two management units can communicate with each other without requiring a third party to perform forwarding, thereby improving communication efficiency.

Descriptions are provided above with reference to an embodiment by using the capability exposure platform as an example of the network device, and descriptions are provided below with reference to an embodiment by using a source control plane device as an example of the network device.

When the network device is a source control plane device, there are the following cases based on different system identifiers obtained by the source control plane device.

A. The source control plane device obtains a source system identifier.

Figure 5:
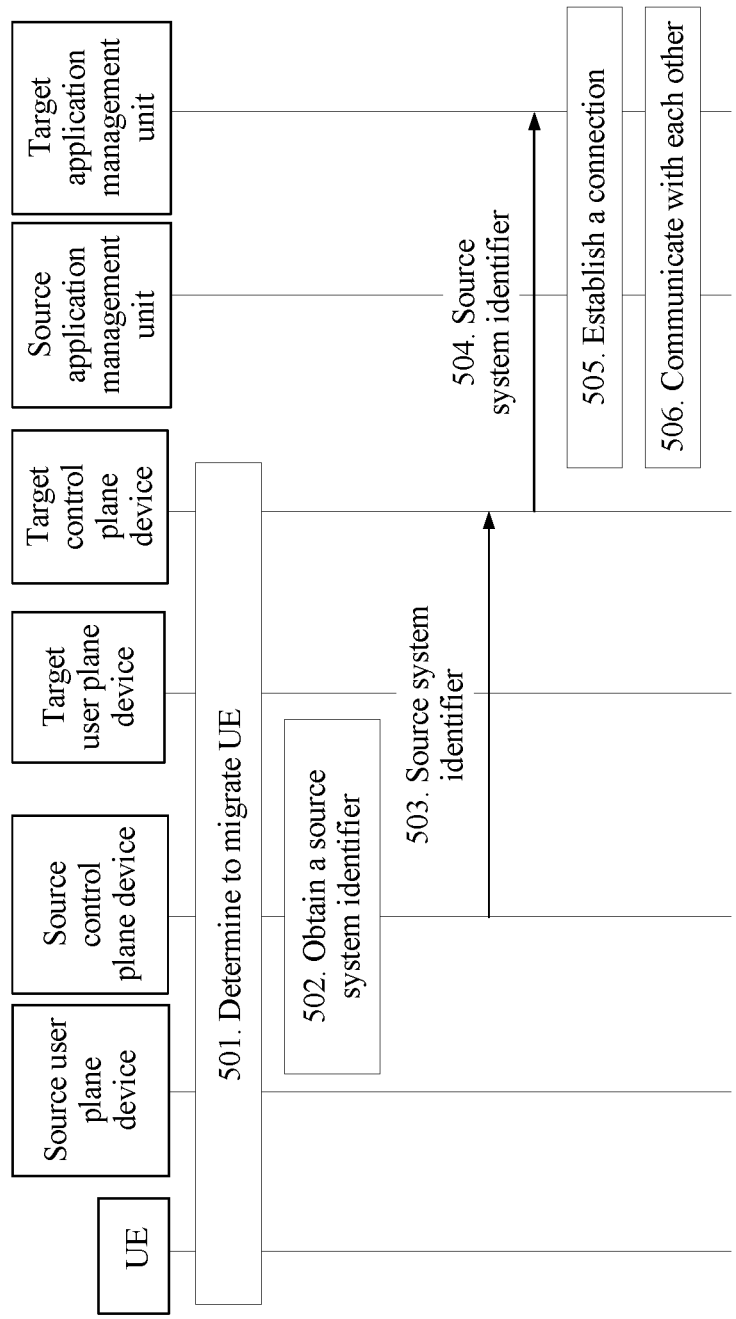
FIG. 5 is a flowchart of another communication method according to an embodiment of the present application.

Referring to FIG. 5, this embodiment includes the following operations.

Operation 501. Determine to migrate UE.

Operation 501 is similar to operation 303 in FIG. 3, and details are not described herein again.

Operation 502. A source control plane device obtains a source system identifier.

Operation 502 is similar to operation 301 in FIG. 3, and details are not described herein again.

It should be noted that there is no sequence for performing operation 501 and operation 502. Operation 501 may be performed before operation 502, or operation 502 may be performed before operation 501. To be specific, the source control plane device may obtain the source system identifier before the UE determines to perform migration, or may obtain the source system identifier after the UE determines to perform migration. This is not limited herein.

Operation 503. The source control plane device sends the source system identifier to a target control plane device.

After receiving a command for handing over the UE, the source control plane device adds the source system identifier to handover request information to be sent to the target control plane device, and the source control plane device may alternatively send the source system identifier to the target control plane device by using other signaling. It should be noted that the source control plane device may further send location information of the UE and a UE ID to the target control plane device, and this is not limited herein.

Operation 504. The target control plane device sends the source system identifier to a target application management unit.

After receiving a handover request sent by the source control plane device, the target control plane device selects a new application system for the UE, and the new application system is a target application system in this embodiment. To be specific, the target control plane device determines to hand over the UE from a source application system to the target application system. The target control plane device sends the source system identifier to the target application management unit. It should be noted that the target control plane device may further send the location information of the UE and the UE ID to the target application management unit.

Operation 505. The target application management unit establishes a connection to a source application management unit.

After the target application management unit receives the source system identifier, if the source system identifier is an address of the source application management unit, the target application management unit performs addressing based on the address of the source application management unit, and establishes the connection to the source application management unit; or if the source system identifier is a unique identifier of the source application system, the target application management unit determines an address of the source application management unit based on a preset correspondence of an address of an application management unit in an application system, and then performs addressing, and establishes the connection to the source application management unit.

Operation 506. The target application management unit and the source application management unit communicate with each other.

After the connection is established between the target application management unit and the source application management unit, the target application management unit and the source application management unit communicate with each other, including: The target application management unit receives application information of the UE that is sent by the source application management unit; the target application management unit determines application target location information of the UE based on the application information of the UE and the location information of the UE; the target application management unit sends the application target location information to the source application management unit; and after receiving the application target location information of the UE, the source application management unit triggers application migration, and activates a local offloading rule of a target user plane device after preparation of an application in the target application system is completed.

In this embodiment, the source control plane device obtains the source system identifier, and sends the source system identifier to the target application management unit by using the target control plane device, so that the connection is established between the target application management unit and the source application management unit, and the target application management unit and the source application management unit communicate with each other without requiring a third party to perform forwarding, thereby improving communication efficiency.

B. The Source Control Plane Device Obtains a Target System Identifier.

Referring to FIG. 6, this embodiment includes the following operations.

Operation 601. Determine to migrate UE.

Operation 601 is similar to operation 303 in FIG. 3, and details are not described herein again.

Operation 602. A source control plane device obtains a target system identifier.

The source control plane device presets service area information and system identifier information of an application system. In this case, the UE has entered a service area of a target application system, and therefore, location information of the UE corresponds to the target application system. The source control plane device determines the target system identifier of the target application system based on the location information of the UE and the preset service area information and system identifier information of the application system.

Operation 603. The source control plane device sends the target system identifier to a source application management unit.

After determining the target system identifier, the source control plane device sends the target system identifier to the source application management unit. The location information of the UE and a UE ID are sent together with the target system identifier, and this is not limited herein.

Operation 604. A target application management unit establishes a connection to the source application management unit.

After the source application management unit receives the target system identifier, if the target system identifier is an address of the target application management unit, the source application management unit performs addressing based on the address of the target application management unit, and establishes a connection to the target application management unit; or if the target system identifier is a unique identifier of the target application system, the source application management unit determines an address of the target application management unit based on a preset correspondence between a unique identifier of an application system and an address of an application management unit in the application system, and then addresses the target application management unit, and establishes a connection to the target application management unit.

Operation 605. The target application management unit and the source application management unit communicate with each other.

In this embodiment, because the target application management unit does not have the location information of the UE, the source application management unit further sends the location information of the UE in addition to application information of the UE to the target application management unit. The target application management unit determines application target location information of the UE based on the application information of the UE and the location information of the UE. The target application management unit sends the application target location information to the source application management unit. After receiving the application target location information of the UE, the source application management unit triggers application migration, and activates a local offloading rule of a target user plane device after preparation of an application in the target application system is completed.

In this embodiment, the source control plane device determines the target system identifier of the target application system based on the location information of the UE and the preset service area information and system identifier information of the application system, and sends the target system identifier to the source application management unit, so that a connection can be established between the two management units, and the two management units communicate with each other without requiring a third party to perform forwarding, thereby improving communication efficiency.

Descriptions are provided above with reference to an embodiment by using the source control plane device as an example of the network device, and descriptions are provided below with reference to an embodiment by using a target control plane device as an example of the network device.

Figure 7:
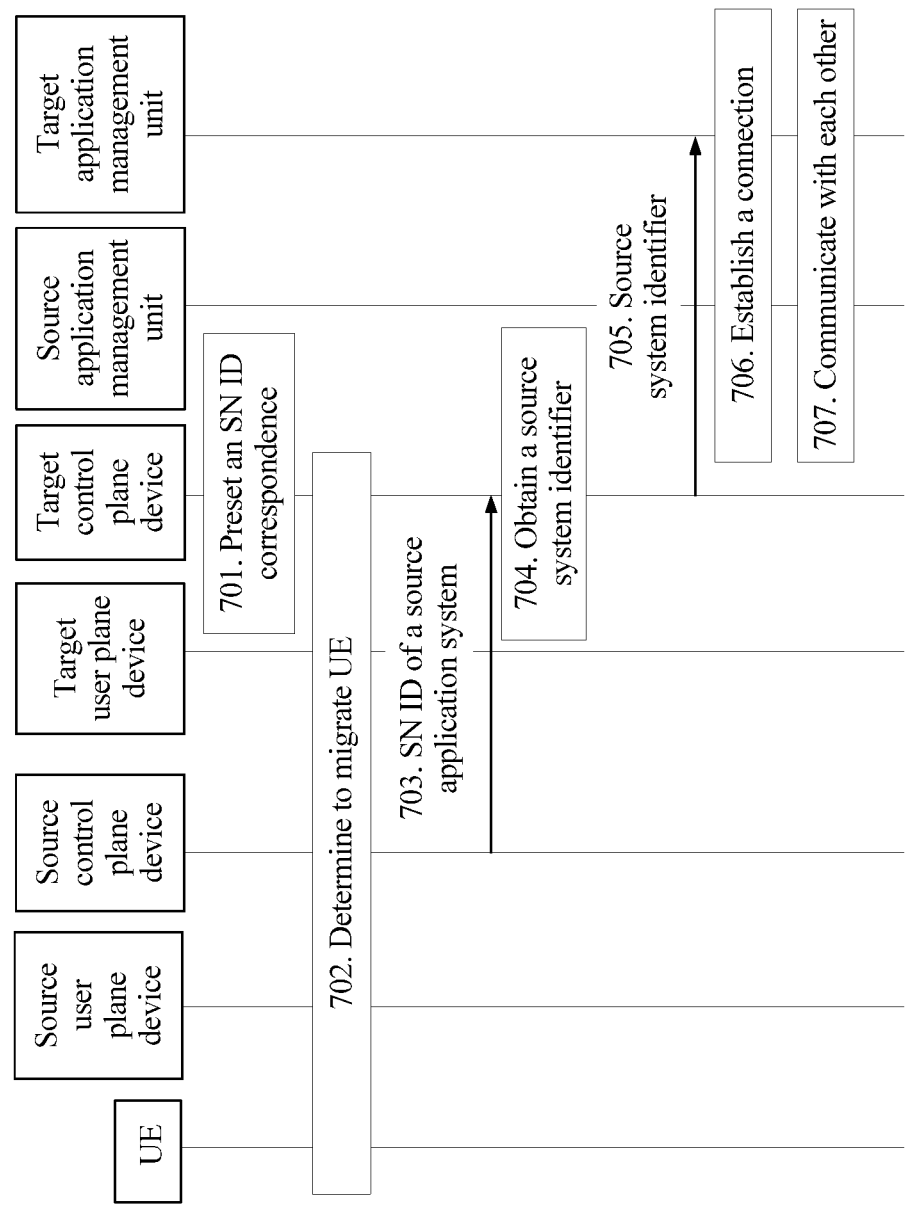
FIG. 7 is a flowchart of another communication method according to an embodiment of the present application.

Referring to FIG. 7, this embodiment includes the following operations.

Operation 701. A target control plane device presets an SN ID correspondence.

A service network identifier SN ID (SN ID) is an identifier used by an operator to identify an application system. If only one application system is deployed in a PLMN network, an SN ID of the application system is a unique identifier corresponding to a system identifier of the application system. The target control plane device presets the SN ID correspondence, and the SN ID correspondence is a correspondence between an SN ID of an application system and a system identifier of the application system.

It should be noted that, for different devices, the SN ID is also referred to as a public land mobile network identifier (PLMN ID).

Operation 702. Determine to migrate UE.

Operation 702 is similar to operation 303 in FIG. 3, and details are not described herein again.

Operation 703. A source control plane device sends an SN ID of a source application system to the target control plane device.

After receiving a command for handing over the UE, the source control plane device adds the SN ID of the source application system to handover request information to be sent to the target control plane device, and the source control plane device may alternatively send the SN ID of the source application system to the target control plane device by using other signaling. It should be noted that location information of the UE and a UE ID may also be sent while a source system identifier is sent, and this is not limited herein.

Operation 704. The target control plane device obtains a source system identifier.

The target control plane device receives the SN ID of the source application system, and determines the source system identifier from the preset correspondence between an SN ID and a system identifier of an application system.

Operation 705. The target control plane device sends the source system identifier to a target application management unit.

Operation 705 is similar to operation 504 in FIG. 5, and details are not described herein again.

Operation 706. The target application management unit establishes a connection to a source application management unit.

Operation 706 is similar to operation 505 in FIG. 5, and details are not described herein again.

Operation 707. The target application management unit and the source application management unit communicate with each other.

Operation 707 is similar to operation 506 in FIG. 5, and details are not described herein again.

In this embodiment, after determining the system identifier of the source application system based on the SN ID of the source application system, the target control plane device sends the source system identifier to the target application management unit, so that a connection can be established between the two management units, and the two management units communicate with each other without requiring a third party to perform forwarding, thereby improving communication efficiency.

It should be noted that, the embodiments of the present application are described in detail in an application scenario of inter-system handover of UE. However, the embodiments of the present application are not only applied to the scenario of inter-system handover of the UE, and may also be applied to the following scenarios:

For example, the embodiments of the present application may be applied to a scenario of synchronizing application installation packages of two application systems. After a connection is established between a source application management unit and a target application management unit by using a system identifier obtained by a network device, the source application management unit requests version information of an application installation package from the target application management unit. If a version of an application installation package of the target application management unit is later than a version of an application installation package of the source application management unit, the source application management unit downloads a new application installation package from the target application management unit, and if the version of the application installation package of the target application management unit is earlier than the version of the application installation package of the source application management unit, the target application management unit downloads a new installation package from the source application management unit. In this way, application installation packages of two adjacent application management units can be synchronized, to avoid downloading the application installation package from a farther application server, and optimize a network.

For example, the embodiments of the present application may be applied to a scenario of temporary asylum in disaster redundancy. When a network of a source application system needs to be temporarily out of service because the network breaks down or requires large-scale upgrade, a source application management unit may apply to a target application management unit for temporary asylum, so that a target application system can continue to provide a service for UE in the source application system, and avoid "service unavailable".

For example, the embodiments of the present application may be applied to a flow guiding scenario. If a third application system other than a source application system and a target application system is required to route data of UE to the target application system, a target application management unit may apply to an application management unit in the third application system for a temporary tunnel, to avoid a case in which the data is identified as harmful data by the application management unit in the third application system and is therefore discarded or routed to a wrong destination address.

For example, the embodiments of the present application may be applied to an authentication scenario. Authentication data and application subscription data of UE may be stored in a subscribed source application management unit. Before a target application system provides a low-delay service for the UE, a target application management unit sends a permission verification request of the UE to the source application management unit. The source application management unit sends a permission verification result of the UE to the target application management unit. The target application management unit determines, based on the permission verification result, whether to provide the low-delay service for the UE.

It may be understood that the several scenarios enumerated herein are merely example descriptions, and in actual application, the embodiments of the present application are not limited to the foregoing application scenarios.

Method embodiments of the embodiments of the present application are described above, and detailed descriptions are provided below from a perspective of apparatus embodiments.

Figure 8:
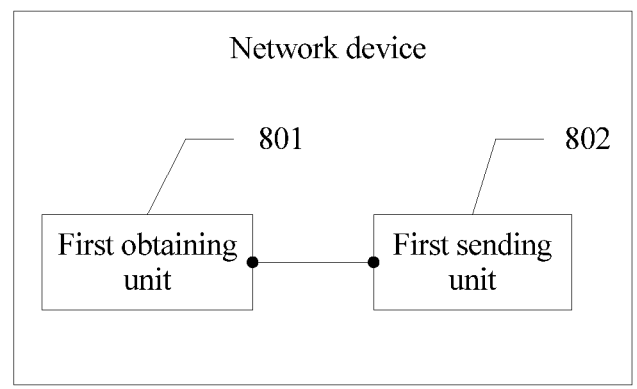
FIG. 8 is a schematic structural diagram of a network device according to an embodiment of the present application.

Referring to FIG. 8, an embodiment of a network device in an embodiment of the present application includes:

a first obtaining unit 801, configured to obtain a source system identifier of a source application system and/or a target system identifier of a target application system; and a first sending unit 802, configured to: send the source system identifier obtained by the first obtaining unit 801 to a target application management unit in the target application system, or send the target system identifier obtained by the first obtaining unit 801 to a source application management unit in the source application system.

It should be noted that the network device may be configured to perform an action performed by the network device, the capability exposure platform, the source control plane device, or the target control plane device in the embodiment shown in any one of FIG. 2a, FIG. 2c, and FIG. 3 to FIG. 7, and details are not described again.

In this embodiment, the first obtaining unit 801 of the network device obtains the source system identifier and/or the target system identifier, and then the first sending unit 802 sends the target system identifier to the source application management unit, or sends the source system identifier to the target application management unit, so that a connection can be established between the source application management unit in the source application system and the target application management unit in the target application system, and the source application management unit and the target application management unit can directly communicate with each other without requiring a third party to perform forwarding, thereby improving communication efficiency.

Because the network device may be a capability exposure platform, a source control plane device, or a target control plane device, detailed descriptions are provided below from different aspects.

1. The network device is a capability exposure platform.

Figure 9:
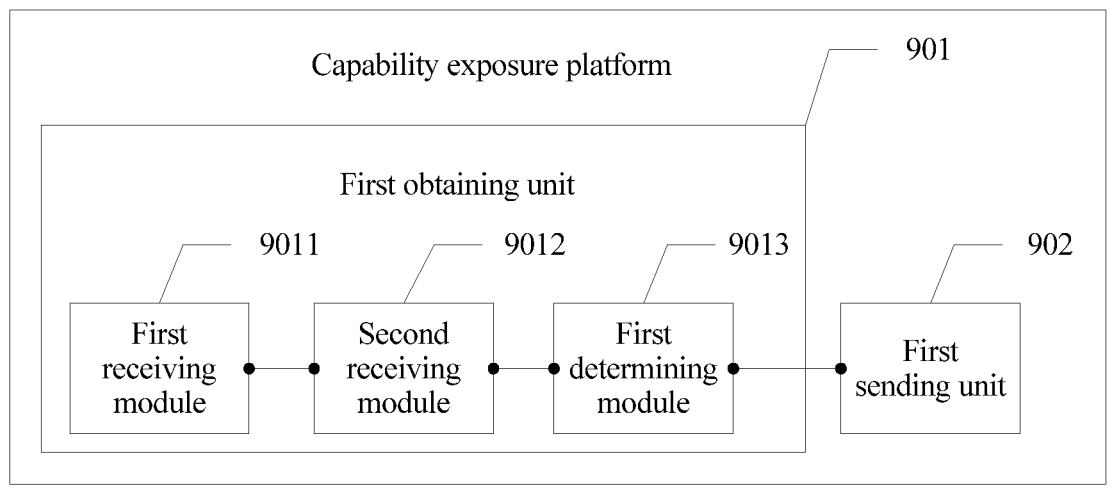
FIG. 9 is a schematic structural diagram of a capability exposure platform according to an embodiment of the present application.

In this embodiment, a source control plane device cannot directly interact with a source application management unit, and a target control plane device cannot directly interact with a target application management unit, but indirectly communicate with each other by using a capability exposure platform. Referring to FIG. 9, this embodiment includes a first obtaining unit 901 and a first sending unit 902.

The first obtaining unit 901 is configured to obtain a source system identifier of a source application system and/or a target system identifier of a target application system.

It should be noted that the first obtaining unit 901 further includes:

a first receiving module 9011, configured to receive the source system identifier sent by a source control plane device in the source application system;

a second receiving module 9012, configured to receive location information of UE that is sent by the source control plane device, where the location information corresponds to a service area of the target application system; and a first determining module 9013, configured to determine the target system identifier based on the location information received by the second receiving module 9012 and preset application system information, where the application system information includes service area information and system identifier information of an application system.

Alternatively, the capability exposure platform may directly receive the system identifier of the target application system, and the capability exposure platform may further include a third receiving module, configured to receive the target system identifier sent by a target control plane device in the target application system.

The first sending unit 902 is configured to: send the source system identifier obtained by the first obtaining unit 901 to a target application management unit, or send the target system identifier obtained by the first obtaining unit 901 to a source application management unit.

It should be noted that the capability exposure platform in this embodiment may be configured to perform an action performed by the capability exposure platform in FIG. 3 or FIG. 4, and details are not described again.

It can be learned that, if the network device is the capability exposure platform, a problem that a control plene device and an application management unit cannot directly interact with each other can be resolved.

2. The network device is a source control plane device, and there may be the following cases based on different system identifiers obtained by the source control plane device.

Figure 10:
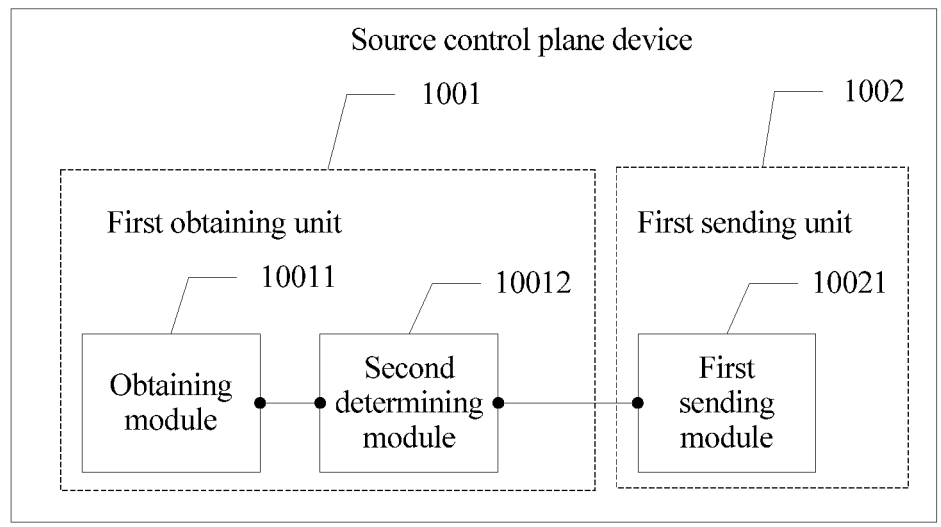
FIG. 10 is a schematic structural diagram of a source control plane device according to an embodiment of the present application.

A. The source control plane device obtains a source system identifier. Referring to FIG. 10, this embodiment includes a first obtaining unit 1001 and a first sending unit 1002.

The first obtaining unit 1001 is configured to obtain the source system identifier.

It should be noted that, if the network device is the source control plane device, the first obtaining unit further includes:

an obtaining module 10011, configured to obtain a destination IP address of a UE from a user plane report; and a second determining module 10012, configured to determine the source system identifier of a source application system based on the destination IP address obtained by the obtaining module 10011 and configuration information.

The first sending unit 1002 is configured to send the source system identifier obtained by the first obtaining unit 1001 to a target application management unit.

The first sending unit 1002 further includes:

a first sending module 10021, configured to send the source system identifier to the target application management unit in a target application system by using a target control plane device.

It should be noted that the source control plane device in this embodiment may be configured to perform an action performed by the source control plane device in FIG. 5, and details are not described again.

It can be learned that, if the network device is the source control plane device, the source control plane device may obtain the source system identifier, and send the source system identifier to the target application management unit, so that more implementations can be provided for this embodiment of the present application.

Figure 11:
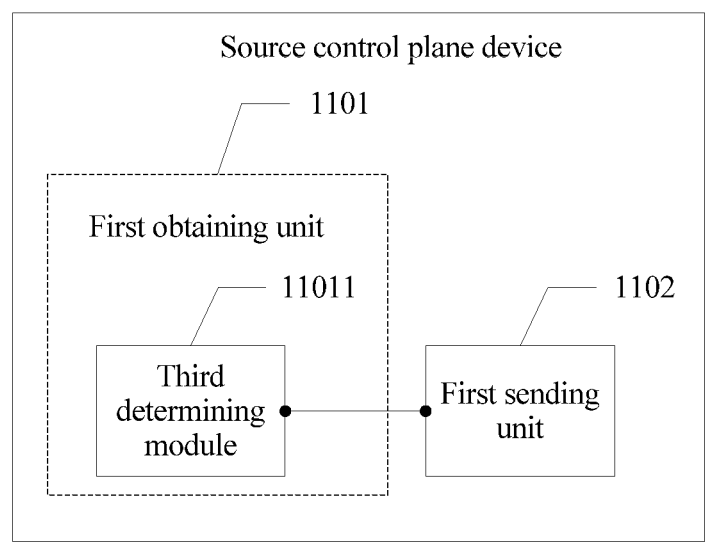
FIG. 11 is a schematic structural diagram of a source control plane device according to an embodiment of the present application.

B. The source control plane device obtains a target system identifier. Referring to FIG. 11, this embodiment includes a first obtaining unit 1101 and a first sending unit 1102.

The first obtaining unit 1101 is configured to obtain the target system identifier.

The first obtaining unit 1101 further includes:

a third determining module 11011, configured to determine the target system identifier of a target application system based on location information of UE and preset application system information, where the application system information includes service area information and system identifier information of an application system, and the location information of the UE corresponds to a service area of the target application system.

The first sending unit 1102 is configured to send the target system identifier obtained by the first obtaining unit 1101 to a source application management unit.

It should be noted that the source control plane device in this embodiment may be configured to perform an action performed by the source control plane device in FIG. 6, and details are not described again.

It can be learned that, if the network device is the source control plane device, the source control plane device may obtain the target system identifier, and send the target system identifier to the source application management unit, so that more implementations are provided for this embodiment of the present application.

Figure 12:
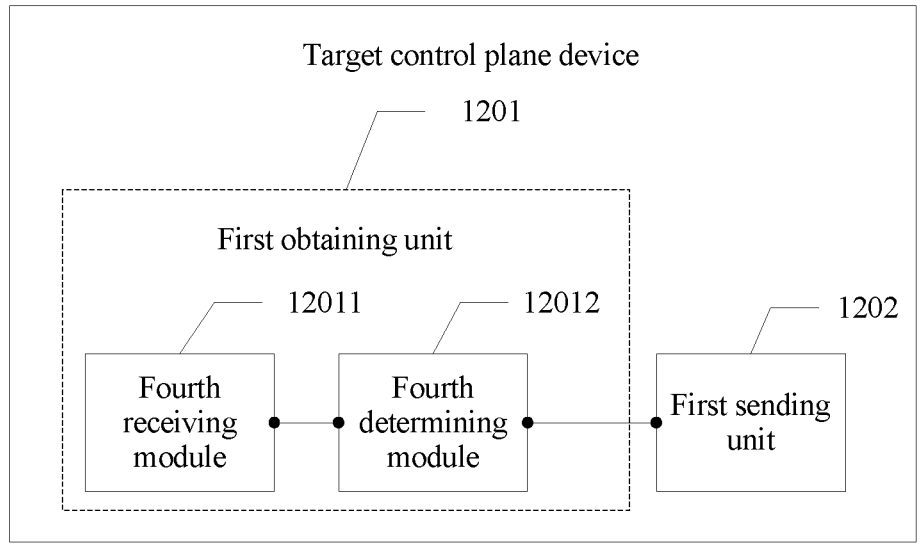
FIG. 12 is a schematic structural diagram of a target control plane device according to an embodiment of the present application.

3. The network device is a target control plane device. Referring to FIG. 12, this embodiment includes a first obtaining unit 1201 and a first sending unit 1202.

The first obtaining unit 1201 is configured to obtain a source system identifier.

The first obtaining unit 1201 further includes:

a fourth receiving module 12011, configured to receive a service network identifier SN ID of a source application system that is sent by a source control plane device; and a fourth determining module 12012, configured to determine the source system identifier based on a preset SN ID correspondence and the SN ID of the source application system that is received by the fourth receiving module 12011, where the SN ID correspondence is a correspondence between an SN ID and a system identifier of an application system.

The first sending unit 1202 is configured to send the source system identifier obtained by the first obtaining unit 1201 to a target application management unit.

It should be noted that the target control plane device in this embodiment may be configured to perform an action performed by the target control plane device in FIG. 7, and details are not described again.

It can be learned that, if the network device is the target control plane device in a target application system, more implementations can be provided for this embodiment of the present application.

Virtual apparatus embodiments on a network device side are described above, and virtual apparatus embodiments on an application management unit side are described below.

A network environment in this embodiment is that UE is handed over between a first application system and a second application system. A first application management unit can be used as a source application management unit, and can also be used as a target application management unit. Referring to an application management unit in FIG. 13, the application management unit in this embodiment is used as the first application management unit in the first application system, and includes:

a first receiving unit 1301, configured to receive a system identifier of a second application system that is sent by a network device; and a connection unit 1302, configured to establish a connection to a second application management unit in the second application system based on the system identifier received by the first receiving unit 1301.

It should be noted that, if the system identifier is an address of the second application management unit, the first application management unit directly establishes the connection to the second application management unit based on the address of the second application management unit, and if the system identifier is a unique identifier of the second application system, the connection unit 1302 may further include:

a fifth determining module, configured to determine the address of the second application management unit based on the unique identifier of the second application system and a preset correspondence, where the correspondence is a correspondence between a unique identifier of an application system and an address of an application management unit in the application system; and a connection module, configured to establish the connection to the second application management unit based on the address that is of the second application management unit and that is determined by the fifth determining module.

Figure 2C:
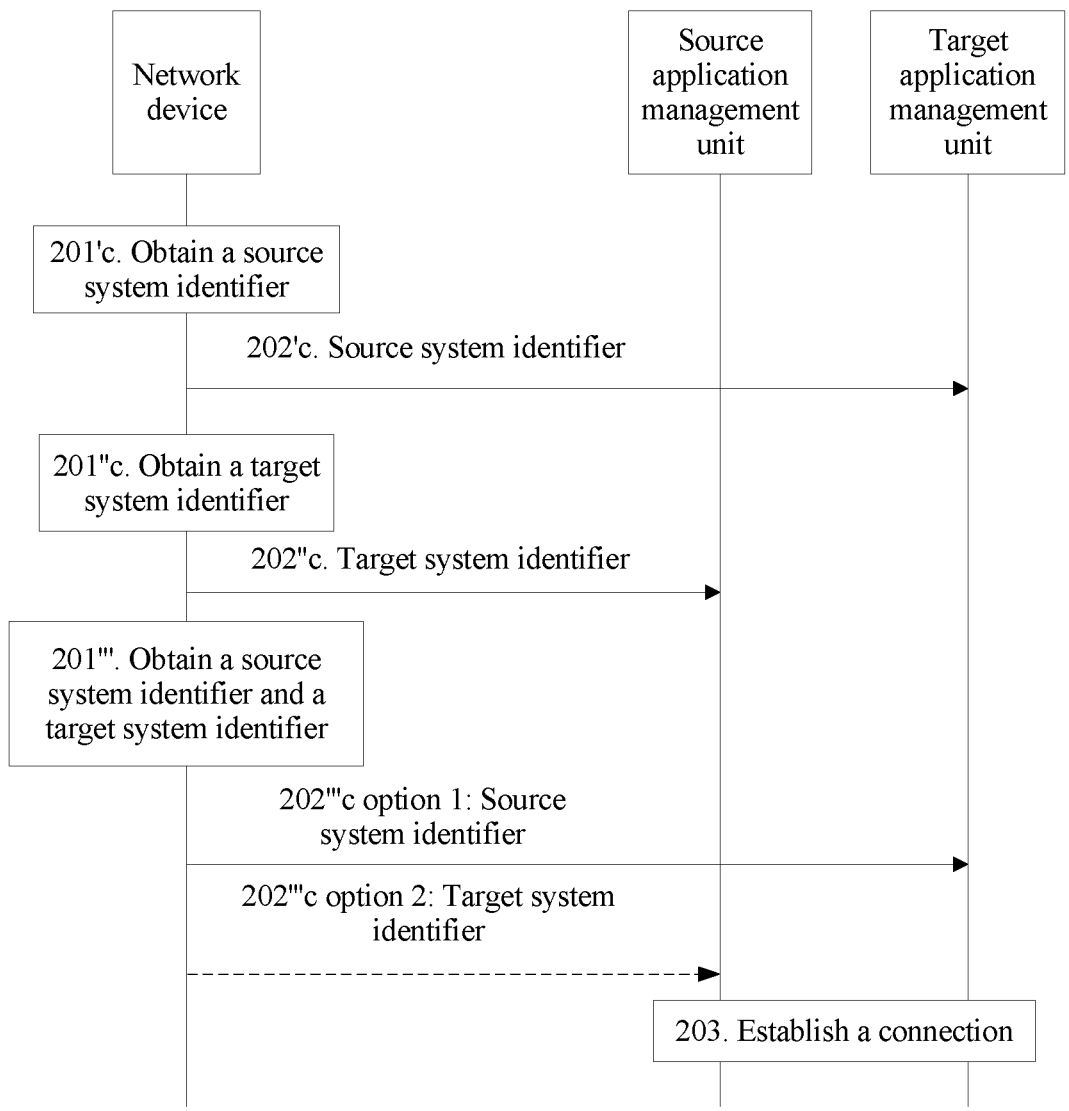
FIG. 2c is a flowchart of another communication method according to an embodiment of the present application.

It should be noted that, the first application management unit in this embodiment may be configured to perform an action performed by the target application management unit that receives the source system identifier in FIG. 2c, or an action performed by the source application management unit that receives the target system identifier in FIG. 2c, or an action performed by the first application management unit in FIG. 2b, and details are not described again.

It can be learned that, after the first receiving unit of first application management unit receives the system identifier, the connection unit may establish the connection to the second application management unit based on the system identifier, so that the first application management unit and the second application management unit directly communicate with each other without requiring a third party to perform forwarding, thereby improving communication efficiency.

After the connection is established between the first application management unit and the second application management unit, the first application management unit and the second application management unit communicate with each other. There may be the following two cases based on whether the first application management unit is used as a source application management unit or a target application management unit.

1. The application management unit is used as a target application management unit.

Figure 13:
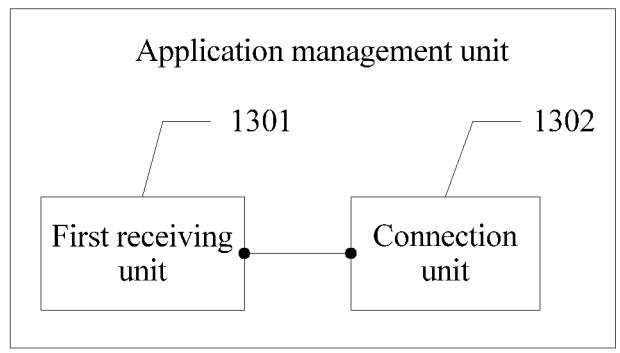
FIG. 13 is a schematic structural diagram of an application management unit according to an embodiment of the present application.
Figure 14:
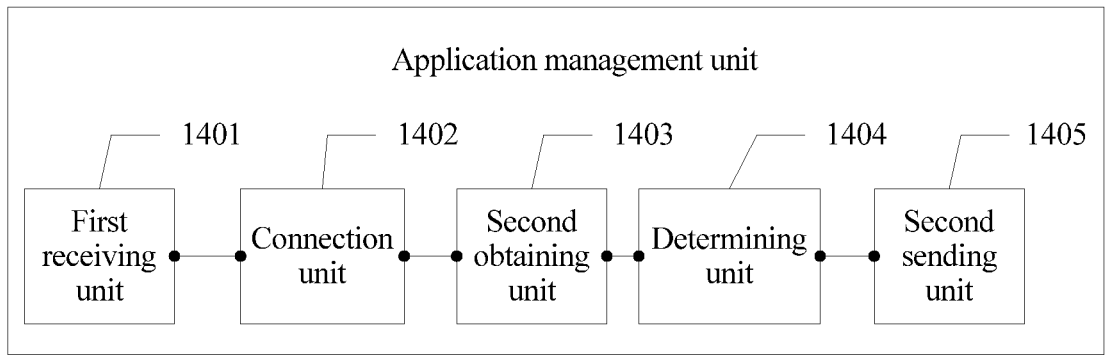
FIG. 14 is a schematic structural diagram of another application management unit according to an embodiment of the present application.
Figure 15:
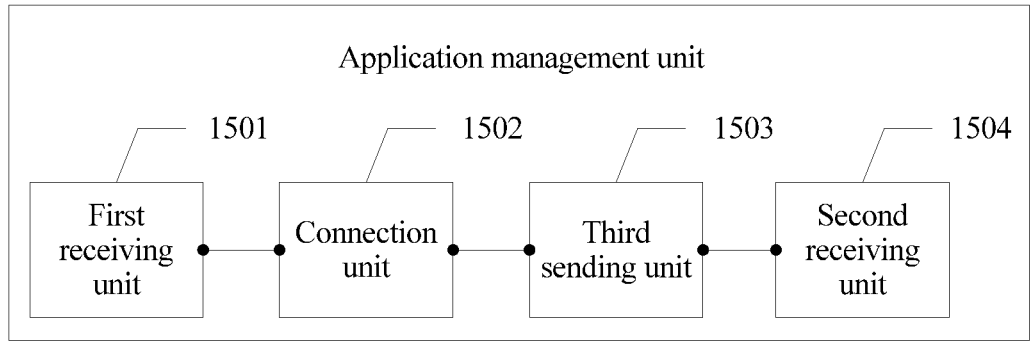
FIG. 15 is a schematic structural diagram of another application management unit according to an embodiment of the present application.

Referring to FIG. 14, this embodiment includes:

a first receiving unit 1401, where a function performed by the first receiving unit 1401 is the same as a function performed by the first receiving unit 1301 in FIG. 13, and details are not described herein again;

a connection unit 1402, where a function performed by the connection unit 1402 is the same as a function performed by the connection unit 1302 in FIG. 13, and details are not described herein again;

a second obtaining unit 1403, configured to obtain application information of a UE from the second application management unit;

a determining unit 1404, configured to determine application target location information of the UE based on the application information of the UE; and a second sending unit 1405, configured to send the application target location information to the second application management unit.

It should be noted that, the first application management unit in this embodiment may be configured to perform an action performed by the target application management unit that receives the source system identifier in FIG. 3 to FIG. 5 and FIG. 7, and details are not described again.

It can be learned that, after a connection is established between the first application management unit and the second application management unit, there is further a process of communicating with each other, thereby further improving implementability of this solution.

2. The Application Management Unit is Used as a Source Application Management Unit.

A function performed by a first receiving unit 1501 is the same as a function performed by the first receiving unit 1301 in FIG. 13, and details are not described again;

a function performed by a connection unit 1502 is the same as a function performed by the connection unit 1302 in FIG. 13, and details are not described again;

a third sending unit 1503 is configured to send application information of a UE and location information of the UE to the second application management unit; and a second receiving unit 1504 is configured to receive a application target location information sent by the second application management unit.

It should be noted that, the first application management unit in this embodiment may be configured to perform an action performed by the source application management unit that receives the target system identifier in FIG. 3 and FIG. 4, or an action performed by the source application management unit in FIG. 6, and details are not described again.

It can be learned that, after a connection is established between the first application management unit and the second application management unit, there is further a process of communicating with each other, thereby further improving implementability of this solution.

The network device and the application management unit in the embodiments of the present application are described above from a perspective of a modular functional entity, and the network device and the application management unit in the embodiments of the present application are described from a perspective of hardware processing.

Figure 16:
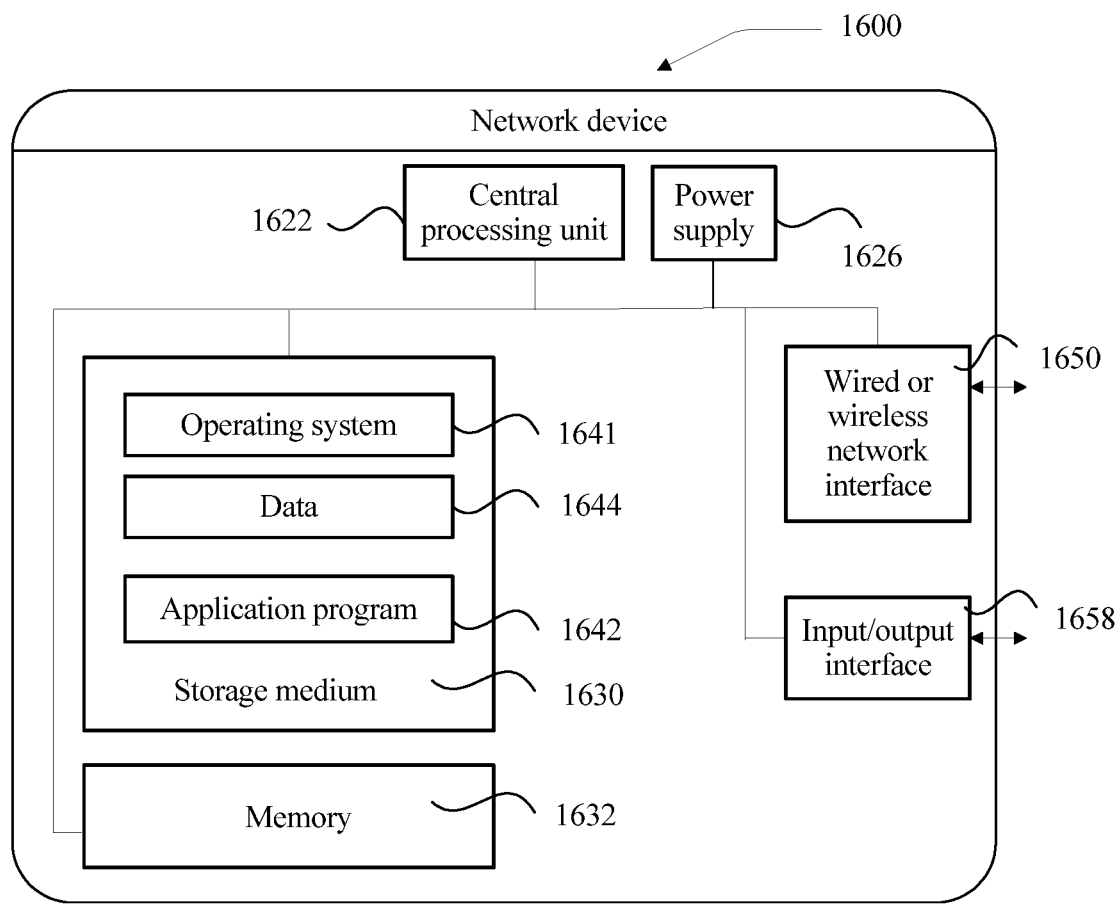
FIG. 16 is a diagram of a hardware structure of a network device according to an embodiment of the present application.

FIG. 16 is a schematic structural diagram of a network device according to an embodiment of the present application. A network device 1600 may differ greatly due to a difference in configuration or performance, and may include one or more central processing units (CPU) 1622 (for example, one or more processors), a memory 1632, and one or more storage media 1630 (for example, one or more mass storage devices) that store an application program 1642 or data 1644. The memory 1632 and the storage medium 1630 may be transitory storage or persistent storage. A program stored in the storage medium 1630 may include one or more modules (not shown in the figure), and each module may include a series of instruction operations to be performed on a server. Further, the central processing unit 1622 may be configured to communicate with the storage medium 1630, to perform, on the network device 1600, the series of instruction operations in the storage medium 1630.

The network device 1600 may further include one or more power supplies 1626, one or more wired or wireless network interfaces 1650, one or more input/output interfaces 1658, and/or one or more operating systems 1641, such as Windows Server™, Mac OS X™, Unix™, Linux™, or FreeBSD™.

By invoking an operation instruction stored in the storage medium, the central processing unit 1622 is configured to perform an action performed by the network device in FIG. 2a or FIG. 2c, and details are not described herein again.

In one embodiment, in some embodiments of the present application, the network device is a capability exposure platform, and the central processing unit 1622 is further configured to perform an action performed by the capability exposure platform in FIG. 3 or FIG. 4, and details are not described herein again.

In one embodiment, in some embodiments of the present application, the network device is a source control plane device, and the central processing unit 1622 is further configured to perform an action performed by the source control plane device in FIG. 5 or FIG. 6, and details are not described herein again.

In one embodiment, in some embodiments of the present application, the network device is a target control plane device, and the central processing unit 1622 is further configured to perform an action performed by the target control plane device in FIG. 7, and details are not described herein again.

In this embodiment, the network device 1600 obtains a source system identifier of a source application system and/or a target system identifier of a target application system, and the network device 1600 sends the source system identifier to a target application management unit, or sends the target system identifier to a source application management unit, so that a connection is established between the application management units, and the application management units communicate with each other.

Figure 17:
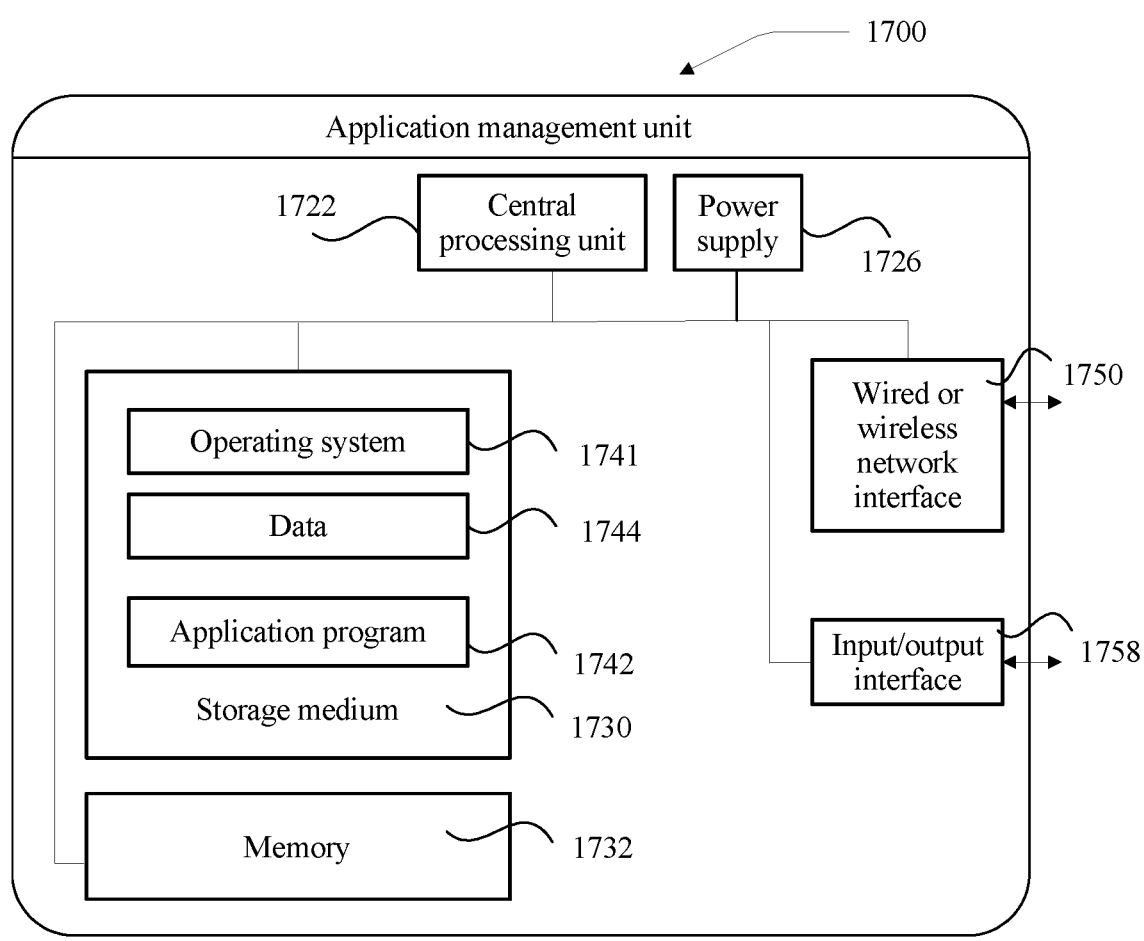
FIG. 17 is a diagram of a hardware structure of an application management unit according to an embodiment of the present application.

FIG. 17 is a schematic structural diagram of an application management unit according to an embodiment of the present application. An application management unit 1700 may differ greatly due to a difference in configuration or performance, and may include one or more central processing units (CPU) 1722 (for example, one or more processors), a memory 1732, and one or more storage media 1730 (for example, one or more mass storage devices) that store an application program 1742 or data 1744. The memory 1732 and the storage medium 1730 may be transitory storage or persistent storage. A program stored in the storage medium 1730 may include one or more modules (not shown in the figure), and each module may include a series of instruction operations to be performed on a server. Further, the central processing unit 1722 may be configured to communicate with the storage medium 1730, to perform, on the application management unit 1700, the series of instruction operations in the storage medium 1730.

The application management unit 1700 may further include one or more power supplies 1726, one or more wired or wireless network interfaces 1750, one or more input/output interfaces 1758, and/or one or more operating systems 1741, such as Windows Server™, Mac OS X™, Unix™, Linux™, or FreeBSD™.

The application management unit 1700 is used as a first application management unit in a first application system. By invoking an operation instruction stored in the storage medium, the central processing unit 1722 is configured to perform an action performed by the target application management unit that receives the source system identifier in FIG. 2c, or an action performed by the source application management unit that receives the target system identifier in FIG. 2c, or an action performed by the first application management unit in FIG. 2b, and details are not described again.

In one embodiment, in some possible embodiments, the first application management unit is used as a target application management unit, and the central processing unit 1722 may be further configured to perform an action performed by the target application management unit that receives the source system identifier in FIG. 3 to FIG. 5 or FIG. 7, and details are not described herein again.

In one embodiment, in some possible embodiments, the application management unit is used as a source application management unit, and the central processing unit 1722 may be further configured to perform an action performed by the source application management unit that receives the target system identifier in FIG. 3 and FIG. 4, or an action performed by the source application management unit in FIG. 6, and details are not described herein again.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the operations of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A communication method for inter-system handover of a user equipment (UE), the communication method comprising:

obtaining, by a network device, a source system identifier of a source application system; and sending, by the network device, the source system identifier to a target application management unit in a target application system, wherein the network device is a capability exposure platform, the capability exposure platform communicates with a source control plane device in the source application system and with a source application management unit in the source application system, the source control plane device not directly communicating with the source application management unit, and the capability exposure platform communicates with a target control plane device in the target application system and with the target application management unit in the target application system, the target control plane device not directly communicating with the target application management unit.

2. The communication method according to claim 1, wherein the obtaining, includes receiving, by the capability exposure platform, the source system identifier from the source control plane device in the source application system.

3. The communication method according to claim 1, further comprising:

receiving, by the capability exposure platform, a target system identifier from the target control plane device in the target application system; or receiving, by the capability exposure platform, location information of the UE from the source control plane device, wherein the location information corresponds to a service area of the target application system, and determining a target system identifier based on the location information and preset application system information, wherein the preset application system information comprises a service area information and a system identifier information of an application system.

4. A communication method for inter-system handover of a user equipment (UE), the communication method comprising:

obtaining, by a network device, a source system identifier of a source application system; and sending, by the network device, the source system identifier to a target application management unit in a target application system, wherein the obtaining comprises:

receiving, by the network device, a service network identifier (SN ID) of the source application system from a source control plane device in the source application system; and determining, by the network device, the source system identifier based on a preset SN ID correspondence and the SN ID of the source application system, wherein the SN ID correspondence is a correspondence between a SN ID and a system identifier of an application system, and wherein the network device is a target control plane device in the target application system.

5. The communication method according to claim 1, wherein the source system identifier comprises an address of a source application management unit or a unique identifier of the source application system.

6. A network device for inter-system handover of a user equipment (UE), the network device comprising: at least one processor and a memory, wherein the memory is configured to store a program, and the at least one processor runs the program in the memory to:

obtain a source system identifier of a source application system; and send the source system identifier to a target application management unit in a target application system, wherein the network device is a capability exposure platform, the capability exposure platform communicates with a source control plane device in the source application system and with a source application management unit in the source application system, the source control plane device not directly communicating with the source application management unit, and the capability exposure platform communicates with a target control plane device in the target application system and with the target application management unit in the target application system, the target control plane device not directly communicating with the target application management unit.

7. The network device according to claim 6, wherein the at least one processor is further configured to:

receive the source system identifier from the source control plane device in the source application system.

8. The network device according to claim 6, wherein the at least one processor is further configured to:

receive location information of the UE from the source control plane device, wherein the location information corresponds to a service area of the target application system, and determine a target system identifier based on the location information and preset application system information, wherein the preset application system information comprises a service area information and a system identifier information of an application system; or receive a target system identifier from the target control plane device in the target application system.

9. A network device for inter-system handover of a user equipment (UE), the network device comprising at least one processor and a memory, wherein the memory is configured to store a program, and the at least one processor runs the program in the memory to:

obtain a source system identifier of a source application system; and send the source system identifier to a target application management unit in a target application system, wherein to obtain the source system identifier, the at least one processor is further configured to:

receive a service network identifier (SN ID) of the source application system from a source control plane device in the source application system; and determine the source system identifier based on a preset SN ID correspondence and the SN ID of the source application system, wherein the SN ID correspondence is a correspondence between a SN ID and a system identifier of an application system, and wherein the network device is a target control plane device in the target application system.

10. The network device according to claim 6, wherein the source system identifier comprises an address of a source application management unit or a unique identifier of the source application system.

11. A communication system for inter-system handover of a user equipment (UE), the communication system comprising: a target application management unit in a target application system; and a network device, the network device being configured to obtain a source system identifier of a source application system, and send the source system identifier to the target application management unit, the target application management unit being configured to establish a connection to a source application management unit in the source application system based on the source system identifier, the network device being a capability exposure platform, the capability exposure platform communicating with a source control plane device in the source application system and with the source application management unit in the source application system, the source control plane device not directly communicating with the source application management unit, and the capability exposure platform communicating with a target control plane device in the target application system and with the target application management unit in the target application system, the target control plane device not directly communicating with the target application management unit.

12. The communication system according to claim 11, wherein the source system identifier comprises an address of the source application management unit or a unique identifier of the source application system.

13. The communication system according to claim 11, wherein when the source system identifier is the unique identifier of the source application system, the target application management unit is further configured to:

determine an address of the source application management unit based on the source system identifier and a preset correspondence, wherein the correspondence is a correspondence between a unique identifier of an application system and an address of an application management unit in the application system; and establish the connection to the source application management unit based on the address of the source application management unit.

14. The communication method according to claim 1, wherein the target application management unit comprises at least one of an application controller and a mobile edge computing orchestrator.

15. The communication system according to claim 11, wherein the target application management unit comprises at least one of an application controller and a mobile edge computing orchestrator.

* * * * *